United States Patent [19]

Usui et al.

[11] Patent Number: 5,244,858
[45] Date of Patent: * Sep. 14, 1993

[54] CATALYST COMPOSITION FOR HYDRODESULFURIZATION OF HYDROCARBON OIL AND PROCESS FOR PRODUCING THE SAME

[75] Inventors: Kazushi Usui, Chiba; Takashi Fujikawa; Katsuyoshi Ohki, both of Saitama, all of Japan

[73] Assignees: Cosmo Research Institute; Cosmo Oil Co., Ltd., both of Tokyo, Japan

[ * ] Notice: The portion of the term of this patent subsequent to Jan. 26, 2010 has been disclaimed.

[21] Appl. No.: 950,156

[22] Filed: Sep. 24, 1992

Related U.S. Application Data

[63] Continuation-in-part of Ser. No. 674,251, Mar. 25, 1991, Pat. No. 5,182,250.

[30] Foreign Application Priority Data

Mar. 23, 1990 [JP]  Japan .................................. 2-74622
Apr. 25, 1990 [JP]  Japan ................................. 2-109295

[51] Int. Cl.$^5$ ..................... B01J 21/04; B01J 23/64; B01J 23/85; B01J 23/24
[52] U.S. Cl. .................................. 502/220; 502/314; 502/254; 502/309; 502/308; 502/204; 502/306; 502/219; 502/221
[58] Field of Search ............... 502/314, 254, 309, 308, 502/204, 306, 219, 220, 221

[56] References Cited

U.S. PATENT DOCUMENTS

| | | | |
|---|---|---|---|
| 3,900,430 | 8/1975 | Beaty | 502/314 |
| 3,933,685 | 1/1976 | Madderra et al. | 502/322 |
| 4,012,340 | 3/1977 | Morimoto | 502/314 |
| 4,018,672 | 4/1977 | Moser | 502/314 X |
| 4,018,714 | 4/1977 | Wilson et al. | 502/314 X |
| 4,820,680 | 4/1989 | Kemp | 502/314 |
| 4,837,193 | 6/1989 | Akizuki et al. | 502/314 X |

FOREIGN PATENT DOCUMENTS

0013980 8/1980 European Pat. Off.

*Primary Examiner*—W. J. Shine
*Assistant Examiner*—Douglas J. McGinty
*Attorney, Agent, or Firm*—Sughrue, Mion, Zinn, Macpeak & Seas

[57] ABSTRACT

A catalyst composition for the hydrodesulfurization of a hydrocarbon oil, comprising a composite of metal oxides comprising:
aluminum; and
at least one metal selected from a group consisting of
(A) at least one metal belonging to Group VIB of the Periodic Table; and
(B) at least one the metal belonging to Group VIII of the Periodic Table;
where the at least one metal belonging to Group VIB of the Periodic Table accounts for, in terms of as oxide, from 10 to 60% by weight with respect to the total catalyst, and the at least one metal belonging to Group VIII of the Periodic Table accounts for, in terms of oxide, from 3 to 20% by weight with respect to the total catalyst, and wherein no peak assigned to $\gamma\text{-Al}_2\text{O}_3$ is present in X-ray diffraction.

24 Claims, 14 Drawing Sheets

XRD PATTERN OF THE CATALYST OF COMPARATIVE EXAMPLE 2

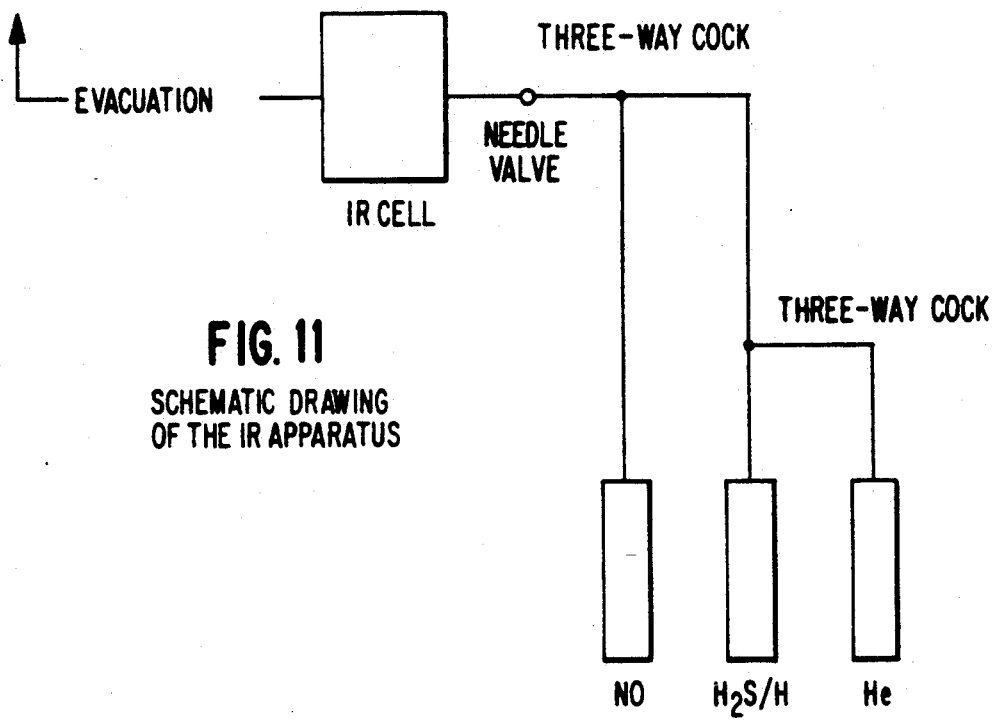

FIG. 11
SCHEMATIC DRAWING OF THE IR APPARATUS

FIG. 12
SAMPLE PREPERATION TO OBTAIN IR SPECTRA OF ADSORBED NO

REMOVAL OF WATER, ETC., ADSORBED ON THE SURFACE OF THE CATALYST, BY HEATING THE CATALYST AT 400° C FOR 30 MINUTES IN He FLOW
↓
SULFIDIZATION TREATMENT IN 10% H S/H AT 400° C FOR 2 HOURS
↓
FLUSHING IN He AT 400° C FOR 30 MINUTES
↓
COOLING TO THE ORDINARY TEMPERATURE IN He FLOW
↓
NO ADSORPTION, FOR 30 MINUTES
↓
EVACUATION WITH He FOR 30 MINUTES
↓
IR ANALYSIS

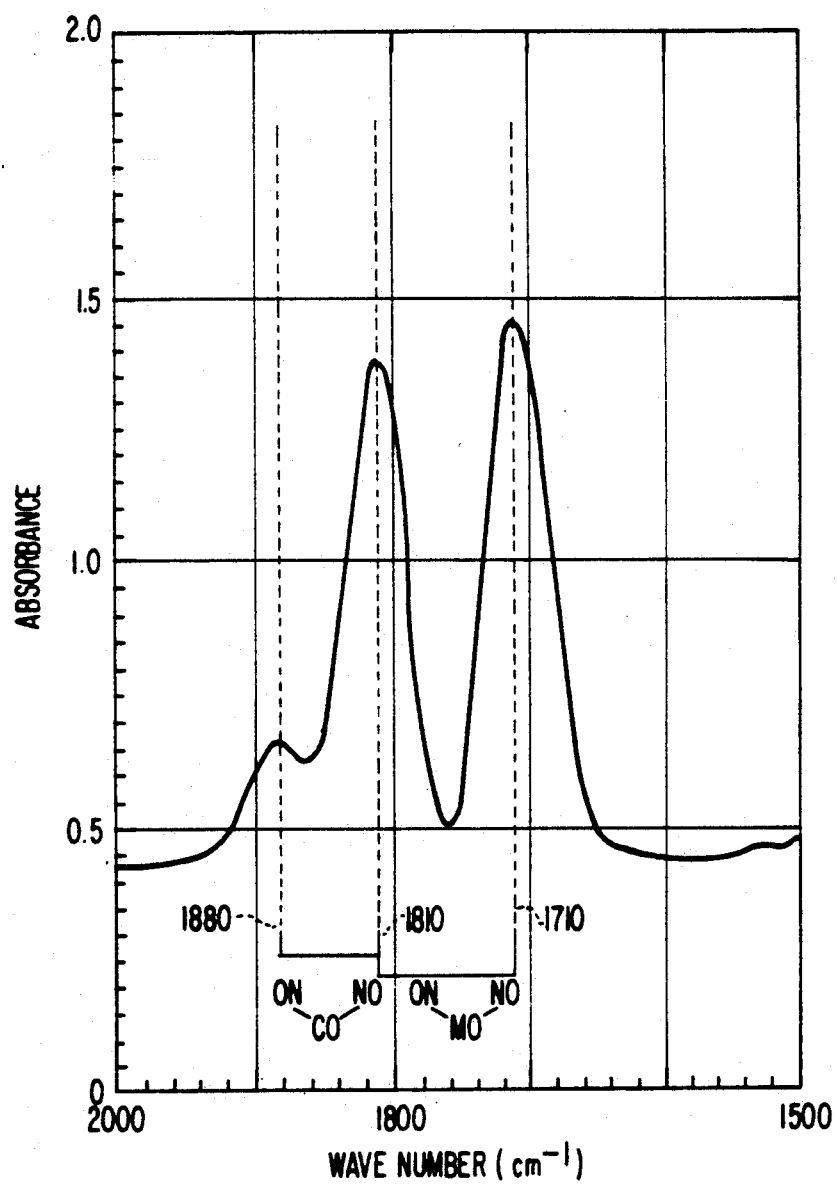

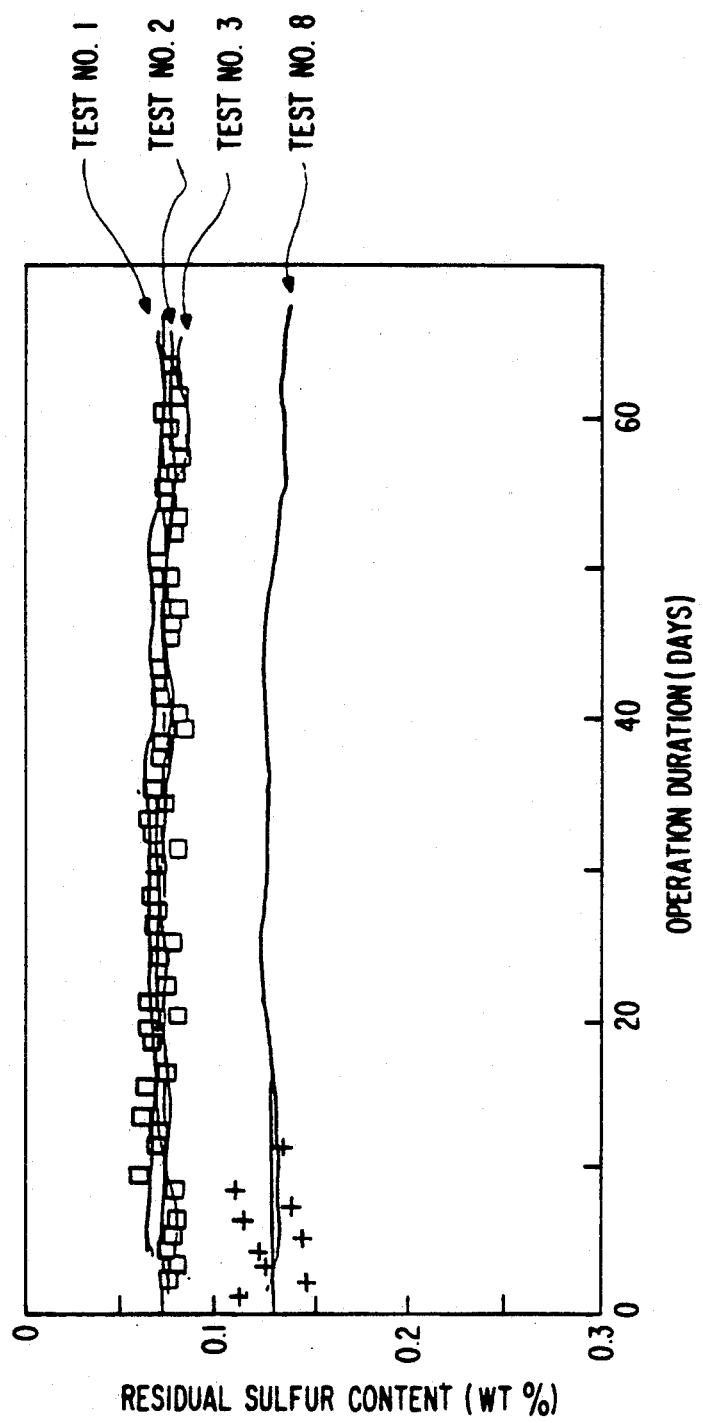

CATALYST COMPOSITION FOR HYDRODESULFURIZATION OF HYDROCARBON OIL AND PROCESS FOR PRODUCING THE SAME

RELATED APPLICATION

This application is a continuation-in-part application of application Ser. No. 07/674,251, filed Mar. 25, 1991, now U.S. Pat. No. 5,182,250.

FIELD OF THE INVENTION

The present invention relates to a novel hydrodesulfurization catalyst composition particularly improved in desulfurizing activity and to a process for producing the same.

BACKGROUND OF THE INVENTION

Hydrocarbon oil generally contains sulfur compounds. When the hydrocarbon oil is used as a fuel, sulfur incorporated therein in the sulfur compounds is converted into sulfur oxides and is discharged into the atmosphere. Accordingly, it is preferred that such hydrocarbon oil have as low as possible a sulfur content from the viewpoint of avoiding air pollution upon combustion. This can be achieved by subjecting the hydrocarbon oil to a catalytic hydrodesulfurization process (HDP).

Since environmental pollution problems such as acid rain and nitrogen oxides ($NO_x$) are of great concern world-wide, the removal of sulfur components from oil at the present technological level seems still insufficient. It is, in fact, possible to further reduce the sulfur content of hydrocarbon oil to some extent by operating the aforementioned HDP under more severe conditions, for example, by controlling the LHSV, temperature and pressure. HDP under such severe conditions, however, produces carbonaceous deposits on the surface of the catalyst, which, in turn, cause an abrupt drop in catalyst activity. The matter is even worse with a hydrocarbon oil which contains a light fraction, since HDP operated under severe conditions has a harmful influence, for example, on the color hue stability and storage stability of the oil. It can be seen that operational improvement is only effective to a certain extent, and more drastic measures are needed to develop a catalyst which is considerably increased in catalyst activity.

Hydrodesulfurization catalysts were conventionally produced by methods such as the so-called "impregnation process", which comprises impregnating a carrier with an aqueous solution having dissolved therein a salt of a metal belonging to Group VIII of the Periodic Table (sometimes referred to simply as a "Group VIII metal", hereinafter, and the same for one belonging to Group VIB of the Periodic Table) and a salt of a Group VIB metal, and, after drying, calcining the metal-impregnated carrier; the "coprecipitation process" which comprises adding an aqueous solution of a salt of a Group VIB metal and an aqueous solution of a salt of a Group VIII metal into an aqueous solution having dispersed therein alumina or a gel thereof to effect coprecipitation of a metal compound; and the "kneading process" which comprises kneading under heating a paste mixture composed of alumina or a gel thereof, an aqueous solution containing a salt of a Group VIB metal, and an aqueous solution containing a salt of a Group VIII metal, to remove water therefrom. For reference, see Ozaki, ed., Shokubai Chousei Kaqaku (Catalyst Preparation Chemistry), pp. 250 to 252, published by Kodansha Scientific.

None of the aforementioned methods, however, are suitable for uniformly dispersing a relatively large amount of metal compounds on the carrier. While it is possible to incorporate an excessive amount of the catalytically active metals in the carrier, there then arises another problem concerning the specific surface area of the catalyst. That is, increasing the amount of the catalytically active metals in the carrier reversely reduces the specific surface area of the catalyst which, as a result, inevitably sets a limit on the improvement in the desulfurizing activity of the catalyst. More specifically, despite that it has been reported that a carrier may carry a relatively large amount of an active metal, the practical content was confined to the range of from about 5 to about 8% by weight in the case of CoO, and from about 19 to about 20% by weight for $MoO_3$.

With respect to a desulfurization process using a conventional catalyst, for example, catalytic hydrodesulfurization of a gas oil containing 1.3% by weight of sulfur carried out at a liquid hourly space velocity of 4 $hr^{-1}$, at a reaction temperature of 350° C., and under a reaction pressure of 35 $kg/cm^2$, this process yields an oil where the sulfur content has been reduced to the range of from about 0.13 to about 0.19% by weight at best. In an another example, i.e., in the case of a vacuum gas oil (VGO) initially containing 2.50% by weight of sulfur, catalytic hydrodesulfurization at a liquid hourly space velocity of 0.4 $hr^{-1}$, at a reaction temperature of 350° C., and under a reaction pressure of 52 $kg/cm^2$, yields a VGO oil the sulfur content of which is reduced only to an insufficient degree, with a limit being in the range of from about 0.15 to about 0.18% by weight. As a further example, a topped crude obtained from a crude oil with a 3.8% by weight sulfur content turns into a product where the sulfur content is lowered but the same is limited to the range of from about 0.9 to about 1.0% by weight, after catalytic hydrodesulfurization at a liquid hourly space velocity of 1.0 $hr^{-1}$, at a reaction temperature of 361° C., and under a reaction pressure of 150 $kg/cm^2$.

The following is known: a process for preparing a catalyst obtained by calcining a heavy metal such as Ni and/or Mo, which has surface areas at least about 300 $m^2/g$, at least about 20% of the pore volume being in pores having diameters greater than about 350 Å and at least about 20% of the pore volume being in pores having diameters less than about 70 Å (U.S. Pat. No. 4,820,680); a catalyst (consisting essentially of a catalytic amount of at least one catalytic metal supported on gamma alumina) and its process obtained by a) hydrolyzing aluminium alkoxides to produce an aqueous alumina slurry and an organic reaction product, b) contacting said aqueous alumina slurry with an effective amount of a suitable organic solvent to form a solvent-aqueous alumina mixture, c) evaporating the solvent and water, and d) forming said alumina into particles and calcining to produce gamma alumina (U.S. Pat. No. 3,900,430). In these, however, the substantially obtained desulfurizing activity is at a similar level to those obtained in generally used catalysts. It is not desired to obtain significantly high desulfurizing activity.

Furthermore, since the physical properties (e.g., surface area, pore volume) and crystal structure of these catalysts have almost similar values to these of conventional catalysts by X-ray diffractometry, it can be understood that these catalysts have no substantial difference in structure.

It is desired to more readily obtain, without operating the HDP under severe operating conditions, a gas oil the sulfur content of which is reduced to the range of from about 0.05 to about 0.08% by weight, and, similarly, a VGO and a topped crude which are reduced in sulfur content to the range of from about 0.08 to about 0.10% and from about 0.6 to about 0.8%, respectively. If this would be possible, not only would the process become highly advantageous in economy from the viewpoint of prolonging the life of the catalyst, but also the resulting oil products would be effective in avoiding air pollution.

An object of the present invention is to develop a catalyst capable of containing a large amount of active metals yet which maintains a relatively high surface area, and which exhibits an extremely high desulfurization activity under ordinary operating conditions such that processing under severe conditions can be avoided.

Another object of the present invention is to provide a fuel oil from which the discharge of sulfur compounds at the time of combustion of the fuel oil is reduced to a level as low as possible, to thereby avoid air pollution.

SUMMARY OF THE INVENTION

The present inventors, after conducting extensive studies to overcome the aforementioned problems, have successfully developed a composite catalyst comprising metal oxides of aluminum, a Group VIII metal, and a Group VIB metal, which is different in structure from conventional catalysts and which, accordingly, can carry the metals of Group VIII and Group VIB at considerably larger quantities as compared with conventional hydrodesulfurization catalysts. Since the catalyst according to the present invention is a composite of metal oxides completely different in structure a compared with those of conventional catalysts, it contains metals at a high content and yet it has a relatively high surface area (about 100 to about 400 $m^2/g$). Thus, the technology according to the present invention enables desulfurization of a hydrocarbon oil to a high degree, and, further advantageously, provides a catalyst with a longer life than conventional HDP catalysts.

That is, in summary, the first embodiment of the present invention provides a catalyst composition for the hydrodesulfurization of hydrocarbon oil, comprising a composite of metal oxides comprising:

aluminum; and at least one metal selected from a group consisting of
(A) at least one of the metals belonging to Group VIB of the Periodic Table; and
(B) at least one of the metals belonging to Group VIII of the Periodic Table;

where the metal(s) belonging to Group VIB of the Periodic Table accounts for, in terms of oxide(s), from 10 to 60% by weight with respect to the total catalyst, the metal(s) belonging to the Group VIII of the Periodic Table accounts for, in terms of as oxide(s), from 3 to 20% by weight with respect to the total catalyst, and, aluminum accounts for, in terms of oxide(s), from 87 to 20% by weight with respect to the total catalyst.

The second embodiment of the present invention provides a process for producing a catalyst composition for hydrodesulfurization of a hydrocarbon oil comprising a composite of a metal oxide comprising aluminum, a metal belonging to Group VIB of the Periodic Table, and a metal belonging to Group VIII of the Periodic Table, which comprises:

drying and thereafter calcining an effective component (a precipitate) obtained by mixing in a solvent, (a) at least one compound of a Group VIB metal, (b) at least one compound of a Group VIII metal, and (c) an aluminum alkoxide or a chelate compound of aluminum, or a mixture thereof.

BRIEF EXPLANATION OF THE DRAWING

FIG. 11 shows the scheme of the apparatus for FTIR. FIG. 12 shows the operation steps for FTIR. FIG. 13 shows a typical IR spectrum of NO adsorbed on CoMo/$Al_2O_3$. FIG. 14 shows the NO-IR spectra of the catalysts $A_1$ and a. FIG. 15 shows the change with operation duration in the residual sulfur content of an oil subjected to a hydrodesulfurization test, using catalysts according to the present invention $A_1$, B, and C (Test Nos. 1, 2, and 3, respectively) and a comparative catalyst T (Test No. 8).

DETAILED DESCRIPTION OF THE INVENTION

Figure 1:
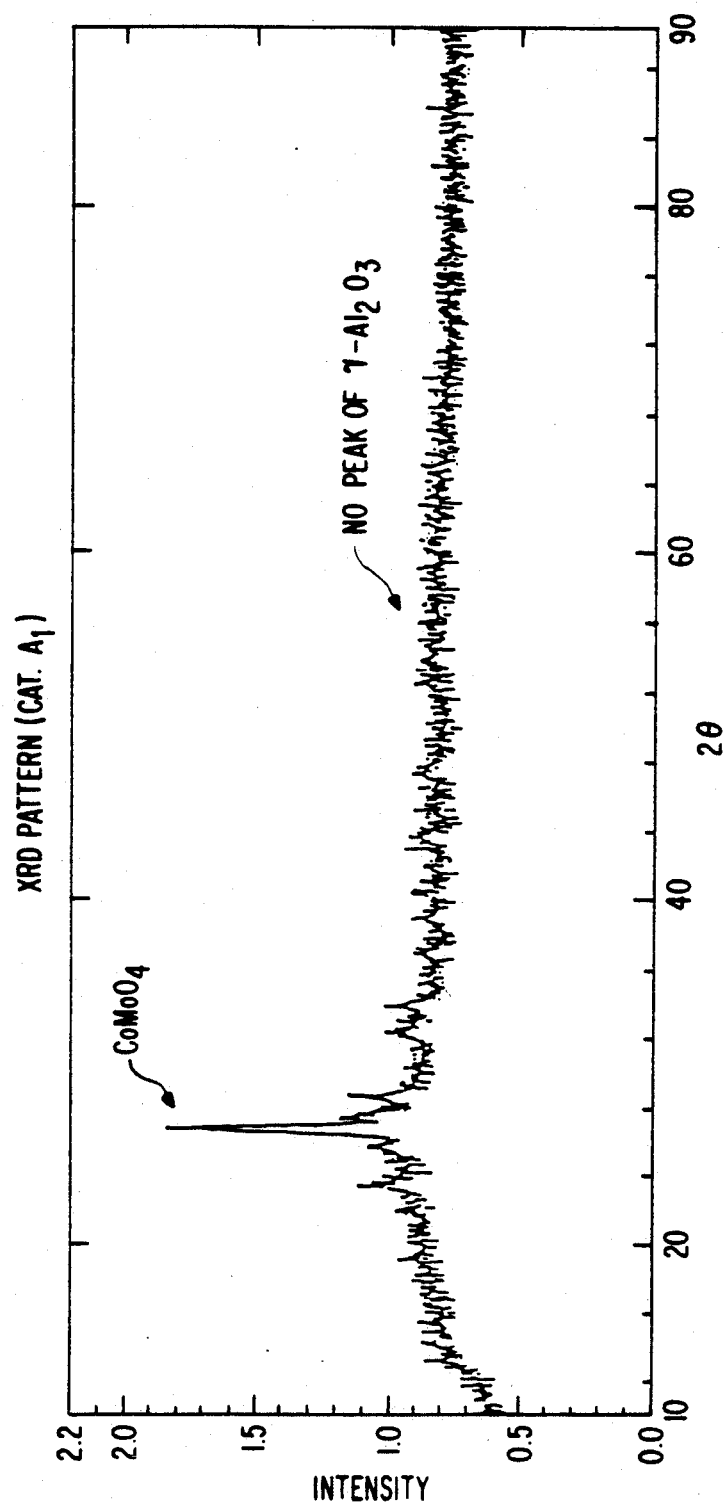
FIGS. 1 to 10 show the X-ray diffraction (XRD) patterns of the catalysts $A_1$ (Ex.1), $A_2$ (Ex.2), $A_3$ (Ex.3), a (Comp. Ex. 1), $b_1$ (Comp. Ex. 3), $b_2$ (Comp. Ex 4), $b_3$ (Comp. Ex. 5), $d_1$ (Comp. Ex. 8), $d_2$ (Comp. Ex. 9), and the catalyst of Comparative Example 2.

The process for producing the hydrodesulfurization catalyst according to the present invention for use in desulfurizing hydrocarbon oil is now explained.

The hydrodesulfurization catalyst for use in desulfurizing hydrocarbon oil can be produced by a process which comprises drying and thereafter calcining an effective component (a precipitate) obtained by mixing in a solvent, (a) at least a compound of a Group VIB metal, (b) at least a compound of a Group VIII metal, and (c) an aluminum alkoxide or a chelate compound of aluminum, or a mixture thereof, and the resulting catalyst composition comprises a composite of metal oxides comprising at least one of the metals belonging to Group VIB of the Periodic Table, at least one of the metals belonging to Group VIII of the Periodic Table, and aluminum. The mixing step of the aforementioned components (a), (b), and (c) preferably is carried out by mixing two or three types of starting solutions each containing one or two of the components, in a manner described below as methods "A" to "D". The compounds (a) or (b) may be of any type so long as they are soluble in the solvent (water or an organic solvent) used in the preparation of the starting solutions. The soluble means a state where a homogenus term solution is formed under normal temperature and normal pressure. The component (c), an aluminum alkoxide, a chelate compound of aluminum or a mixture thereof, is soluble in an organic solvent. But this component (c) is insoluble in water or in a mixed solution thereof with an organic solvent (more specifically, a mixed solution containing an organic solvent and water at an organic solvent/water ratio of more than 0/1 to about 10/1). The term insoluble means a state which is insoluble under nomal temperature and normal pressure.

The catalyst according to the present invention may be prepared by processes as follows:

Process A

A mixture of components (c) and (b) above, and an organic solvent capable of dissolving those components, are mixed and stirred at about 20 to about 300° C. for about 10 minutes to about 1 hour to thereby obtain a homogeneous solution. To the resulting solution there is then added an aqueous solution of the component (a) above, and the effective component (the precipitate) resulting from this mixture is dried, and calcined.

Process B

A mixture of components (c) and (a) above, and an organic solvent capable of dissolving those components are mixed and stirred at about 20° to about 300° C. for about 10 minutes to about 1 hour to thereby obtain a homogeneous solution. To the resulting solution there is then added an aqueous solution of the component (b) above, and the effective component (the precipitate) resulting from this mixture is dried, and calcined.

Process C

Component (c) and an organic solvent capable of dissolving the (c) component are mixed and stirred at about 20° to about 300° C. for about 20 minutes to about 1 hour to thereby obtain a homogeous solution.

To the resulting solution there is then added a mixture of aqueous solutions each containing components (a) and (b), and the effective component (the precipitate) resulting from this mixture is dried, and calcined.

Process D

A mixture of components (c), (b), and (a) above, and an organic solvent capable of dissolving those components are mixed and stirred at about 20° to 300° C. for about 10 minutes to about 1 hour to thereby obtain a homogeneous solution. To the resulting solution there is then added water, and the effective component (the precipitate) resulting from this mixture is dried, and calcined. Water may be used at an appropriate amount sufficient to hydrolyze compnent (c).

An aluminum alkoxide or a chelate compound of aluminum is used as the essential component in the processes according to the present invention, and it may partly be substituted by at least one of the alkoxides and chelate compounds of silicon, titanium, zirconium, boron, gallium, magnesium, and hafnium. The chelate compounds have 7 to 20 carbon atoms. The alkoxide compounds include, for example, Ti iso-propoxide, Zr iso-propoxide, etc. The amount of substitution may be arbitrarily selected, but a preferred amount is, in terms of oxides, from 5 to 10 parts by weight (hereinafter the same, unless otherwise indicated) of at least one of the alkoxides and chelate compounds of silicon, titanium, zirconium, boron, gallium, magnesium, and hafnium, with respect to the whole amount of alkoxide(s) or chelate compound(s) present, wherein the aluminum alkoxide or the chelate compound of aluminum accounts for from 90 to 95 parts with respect to the whole amount.

Any alkoxide may be used for the aluminum alkoxide of the present invention, but preferred from the view of ease of drying are those having from 1 to 5 carbon atoms in the alkoxyl group thereof, and specifically there can be mentioned aluminum methoxide, aluminum ethoxide, aluminum isopropoxide, aluminum n-butoxide, and aluminum sec-butoxide. The aluminum alkoxide for use in the present invention may be commercially available, or may be such prepared by the Ziegler process.

As a substitute for the aluminum alkoxide, there may be used chelate compounds of aluminum, either singly or as a mixture thereof with aluminum alkoxides. The chelate compounds of aluminum for use in the present invention include those commercially available, such as aluminum ethylacetoacetatediisopropylate, aluminum acetoacetatedibutoxide, aluminum tris-(acetylacetonate), and aluminum bis-(ethyl-acetoacetate)mono-(acetyl-acetonate).

The metal belonging to Group VIB of the Periodic Table for use in the present invention includes chromium, molybdenum, and tungsten, and preferred among them are molybdenum and tungsten.

The metal belonging to Group VIII of the Periodic Table for use in the present invention includes iron, cobalt, nickel, ruthenium, rhodium, palladium, osmium, iridium, and platinum, but preferred among them are cobalt and nickel which belong to the iron group.

The Group VIB metal compound and the Group VIII metal compound should be soluble in the organic solvent or in the water used, and useful in the present invention are, for example, nitrates, chlorides, sulfates, acetates, acetylacetonates, and ammonium salts of the metal acids thereof. The ammonium salts include, for example, ammonium molybdate, ammonium tungstate, etc.

The organic solvent for use in dissolving the (c) component and the Group VIB metal and/or Group VIII metal is essential for preparing a homogeneous solution of the components above or for smoothly carrying out the subsequent gelation step or the like. As such organic solvents, there may be used alcohols, ethers, ketones, and aromatic group compounds. Specifically preferred among them are acetone, methanol, ethanol, n-propanol, iso-propanol, n-butanol, iso-butanol, hexanol, benzene, toluene, xylene, diethyl ether, tetrahydrofuran, and dioxane, which may be used either singly or as a mixture thereof.

The mixed solution, i.e., the solution which contains more than one component, for use in Processes A to D described above comprises as components (c) an aluminum alkoxide or a chelate compound of aluminum, (a) a Group VIB metal, or (b) a Group VIII metal, and an organic solvent capable of dissolving the components (a) to (c), in an amount (in terms of oxides and given by weight, unless otherwise indicated) as described below according to each of the processes A and B:

In Process A, the mixed solution comprises from about 50 to about 98% of the component (c) and from about 50 to about 2% of the component (b), but preferred is the mixed solution which comprises from about 60 to about 80% of component (c) and from about 40 to about 20% of component (b).

In Process B, the mixed solution comprises from about 32 to about 96% of the component (c) and from about 68 to about 4% of the component (a), but preferred is the solution which comprises from about 40 to about 80% of component (c) and from about 60 to about 20% of component (b). In Process C, the component (c) is about 20 to about 87 wt %.in terms of dry basis. In Process D, the mixing ratio of the components (a), (b), and (c) is (a) about 10 to about 60 wt %, (b) about 3 to 20 wt %, and (c) about 87 to about 20 wt % in terms of dry basis.

The organic solvent in those processes may be used at an appropriate amount sufficient to dissolve the component (c) and the component (a) or (b). There is no particular restriction concerning the method for mixing the aforementioned components, and those commonly used are practiced. Mixing is conducted until a homogeneous solution is obtained. In general, the mixing is carried out at from about 20° to about 300° C., more preferably, at from about 50° to about 200° C., for a duration of from about ten-and-several minutes to about 1 hour to obtain a homogeneous solution as desired.

In the Processes A to D according to the present invention, to the solution which contains more than one component (simply referred to as "organic solvent mixture", hereinafter) comprising an organic solvent having dissolved therein the component (c) is added an aqueous solution (simply referred to as "aqueous solution", hereinafter) containing a compound of the remaining component, or water, to thereby obtain a mixed slurry comprising components (a), (b), (c), and a solvent. In Process D according to the present invention, to the organic solvent mixture having dissolved therein the components (a), (b), and (c) is added water, to thereby otain a mixed slurry. In both of Processes A, B, and D, preferred as the organic solvent solution of the compound of the Group VIB metal is that obtained by dissoving, for example, molybdenum oxide acetylacetonate, and as the organic solvent solution of the compound of the Group VIII metal is that obtained by dissolving, for example, cobalt acetylacetonate.

Preferred as the aqueous solution of the Group VIB metal compound are those obtained by dissolving, for example, ammonium para-molybdate, ammonium bichromate, or ammonium para-tungstate into ion-exchanged water.

Preferred as the aqueous solution of the Group VIII metal compound are those obtained by dissolving, for example, cobalt nitrate hexahydrate, cobalt chloride hexahydrate, nickel nitrate hexahydrate, or nickel chloride hexahydrate in ion-exchanged water.

The aqueous solution or water in each of the Processes, A to D preferably is gradually mixed with the organic solvent mixture, and more preferably, is mixed dropping. If the mixing is instantaneous, the reaction will be insufficiently effected such that the catalyst resulting therefrom would be an unfavorable one, in which the metal oxides are non-uniformly distributed. The mixing is conducted in the temperature range of from about 20° to about 300° C., and preferably in the range of from about 50° to about 200° C. for about 10 minutes to several days. In Processes A to D, the amount of the component (a) is, as expressed by the amount of the Group VIB metal compound(s) in terms of oxide(s), about 1.0 to 7.0 times, and preferably about 2.0 to 4.0 times the amount of the Group VIII metal. The concentration of the aqueous solution may be at an appropriate amount sufficient to dissolve the Group VIB metal compounds or the Group VIII metal compounds.

It is preferred that an acid be added to the aqueous solution or water at its preparation, or at the mixing of the aqueous solution with the organic solvent mixture. As useful acids, there can be mentioned phosphoric acid, nitric acid, and hydrochloric acid, with phosphoric acid being the most preferred among them. By thus adding an acid, the dissolution of the metal compounds into the aqueous solution may be accelerated, or the strength of the final catalyst composition may further be increased. A trace amount thereof is sufficient for such purposes, but it is preferred that the acid be added in an amount of from about 0.5 to about 5% by weight with respect to the alumina derived from component (c) (in terms of oxide). Acid added in excess decreases activity, and makes the effect on improving strength less noticeable.

For any of Processed A to D, drying and calcining is typically at the following conditions.

The effective component (the precipitate) is obtained by mixing the organic solvent mixture and the aqueous solution(s) or water set forth above, and a slurry results as the stirring is continued. The effective component (the precipitate) may be extracted with any of the known methods, such as a method for obtaining a dry gel, which comprises removing the solvent using a rotary evaporator under reduced pressure and in the temperature range of from about 50° to about 200° C.; and a method of simply filtering the mixture with a paper filter to separate the effective component.

The dry gel which, if necessary, is calcined in the temperature range of from about 200° to about 800° C. for a duration of from about 1 to about 24 hours in air, and further activated by a sulfurization treatment, if desired or necessary, in the temperature range of from about 150° to about 700° C. The sulfurization treatment includes, for example, gas sulfurization by $H_2S$, liquid sulfurization by LGO, etc., and hydrogen. More specifically, the sulfurization is conducted by 5% $H_2S$ and 95% $H_2$ at about 150° to about 700° C. for 2 hours under normal pressure. The dry gel obtained above, which may undergo a calcining and/or an activation treatment as described above, is then subjected to reaction.

The hydrodesulfurization catalyst according to the present invention for use in treating a hydrocarbon oil can be prepared by any of the processes earlier discussed. The catalyst can carry a considerably higher amount of active metals as compared with conventional catalysts, and yet maintain a high surface area (100 to 400 m$^2$/g) and large pore volume (0.35 to 0.57 cc/g).

The catalyst according to the present invention carries the active metals at an amount of, in terms of oxides by weight with respect to the total catalyst, from about 10 to about 60%, preferably, from about 15 to about 55%, and more preferably, from about 20 to about 50% of at least one Group VIB metal, and from about 3 to about 20%, and preferably, from about 5 to about 18% of at least one Group VIII metal. If the amount is too low, insufficient effects are to be expected; if the amount is too high, not only will the catalyst strength be reduced, but also the effect of improving strength becomes less noticeable. If the amount of the alumina is too low, dispersion of the active metal becomes insufficient.

The characteristic features of the catalyst according to the present invention are closely associated with the novel catalyst structure which can only be realized by the production process according to the present invention. A typical conventional hydrodesulfurization catalyst comprises a carrier made of an alumina or the like carrying thereon active metals. In such a structure, too high an active metal content adversely reduces the specific surface area thereof. As a consequence,, the active metal carried thereon was inevitably limited to a certain amount. On the contrary, the catalyst according to the present invention is based on a production process which involves the novel idea that there is no concept of a "carrier". Also, it is not a metal carrying form. From this evidence, the catalyst according to the present invention is different from conventional catalysts in structure. As shown in the following examples, conventional catalysts show the peak of $\gamma$-Al$_2$O$_3$ in their X-ray diffraction pattern, but no such a peak appears in the catalyst according to the present invention.

Furthermore, on analyzing the IR spectrum of NO adsorbed on a catalyst which has been subjected to a sulfurization treatment, in the case of a conventional catalyst, a greater amount of NO is adsorbed on the metals belonging to Group VIB of the Periodic Table, rather than the metals belonging to Group VIII of the Periodic Table, which has been considered to be strongly influential on the activity. In contrast, in the catalyst according to the present invention, the IR spectrum reveals that a greater amount of NO is adsorbed on the metals belonging to Group VIII of the Periodic Table, rather than the metals belonging to Group VIB of the Periodic Table, as compared to the conventional catalysts. Thus, it can be said that the catalyst according to the present invention is different from the conventional catalyst in structure.

Presumably, the catalyst according to the present invention may have the structure of an uniform composite comprising oxides of aluminum, a Group VIB metal, and a Group VIII metal at random, or, if not completely random, it may have the structure mainly comprising alumina coordinated with active metal oxides in a complicated manner to increase activity.

When a typical X-ray diffraction is conducted under X-ray irradiation using a Cu lamp, no peak of $\gamma$-Al$_2$O$_3$ appears in the X-ray diffraction pattern of the catalyst according to the present invention (which appears in the conventional catalyst) as in the following table.

When NO adsorbed on the catalyst is determined using the FTIR after the sulfurization and NO adsorption, the ratio of the height of the peak (intensity) in the lower wave number side by which NO is adsorbed on the metals belonging to Group VIB of the Periodic Table to the height of the peak (intensity) in the higher wave number side by which NO is adsorbed on the metals belonging to Group VIII of the Periodic Table of the catalyst according to the present invention is 10/2 to 1/100, preferably 10/3 to 1/10, more preferably 10/4 to 1/10 in the IR spectrum.

In this sulfurization treatment, any gaseous compound containing sulfur can be used, but it is preferred to use a mixed gas of hydrogen sulfide and hydrogen. In this case, sulfurization is conduced using a mixed gas of H$_2$S/H$_2$=1/99 to 30/70 (vol %/vol %) at 150° to 700° C. for 30 minutes to 24 hours, preferably 1 to 3 hours. After the sulfurization, NO is adsorbed for measurement. The NO adsorption is conducted for 10 minutes to 5 hours, preferably 20 minutes to 1 hour.

| Peak Position of $\gamma$-Al$_2$O$_3$ in X-ray Diffraction | |
|---|---|
| 2$\Theta$ | Relative Intensity |
| 66.7 | 100 |
| 45.8 | 80 |
| 37.6 | 65 |

The catalyst according to the present invention comprises pores of about 73 to about 108 Å in mean diameter. The catalyst when molded into a cylinder about 3.2 to about 3.6 mm in length and about 1.4 to about 1.6 mm in diameter yields a compacted bulk density of about 0.76 to about 0.80 g/ml and a dashing strength at the side wall of about 1.1 to about 1.4 kg/mm (which corresponds to about 2.4 to 3.1 lbs/mm), which is not inferior as compared to conventional hydrodesulfurization catalysts.

In the practical use of the catalyst according to the present invention, it may be used in mixture with conventional catalysts or with refractory inorganic oxide carriers well known in the art.

The hydrocarbon oil according to the present invention includes the light fraction obtained by topping or vacuum distillation of crude oil, topping residue, and vacuum residue. It also includes coker gas oil, solvent deasphalted oil, oil extracted from tar sand or oil shale, and product oil from the liquefaction of coal.

On a commercial scale, a desulfurizing apparatus for carrying out a catalytic hydrogenation treatment comprises a proper reactor which is used as a fixed bed, a moving bed, or a fluidized bed for the catalyst particles. To carry out the desulfurization as desired, the object oil charged to the reactor is subjected to high temperature and high pressure conditions under a considerably high partial pressure of hydrogen. In a typical desulfurization, the catalyst is maintained as a fixed bed, and the oil to be treated is allowed to pass over the bed. The catalyst may be charged in a single reactor, or may be distributed in two or more continuous reactors. When the starting oil is a heavy oil, it is strongly preferred that a multistage reactor be used. The catalytic reaction is preferably carried out in a temperature range of about 200° to about 500° C., more preferably in a range of from about 250° to about 400° C.; at a liquid hourly space velocity in a range of about 0.05 to about 5.0 hr$^{-1}$, more preferably, in a range of from 0.1 to 4.0 hr$^{-1}$; under a hydrogen pressure in a range of about 30 to about 200 kg/cm$^2$G, and more preferably, in a range of from about 40 to about 150 kg/cm$^2$G.

The catalyst according to the present invention can be prepared by a relatively simple process, and yet, the specific desulfurizing activity thereof as obtained from the rate constant calculated under a constant reaction condition is considerably high as compared with those of conventional catalysts. More specifically, for example, in the case of a light gas oil (containing 1.3% by weight of sulfur), the sulfur content of the product oil subjected to treatment with the catalyst according to the present invention was reduced to a very low level of 0.07% by weight, as compared with that of 0.15% by weight, at best, of a product oil produced via a conventional process. Similarly, VGO (containing 2.5% by weight of sulfur) was reduced in sulfur content to as low as 0.08% by weight as compared with the conventional 0.15% by weight; and a heavy oil (containing 3.8% by weight of sulfur) was reduced in sulfur content to 0.7% by weight as compared with the conventional 0.9% by weight. Those were achieved quite easily without subjecting the oil to severe conditions. Thus, it can be seen that the activity of the catalyst is highly stable with the passage of time. Since there is no need to carry out extended operation under severe conditions, the catalyst according to the present invention is of great economical advantage. Furthermore, the use of the catalyst according to the present invention provides fuel oil considerably reduced in sulfur content, which, in turn, avoids air pollution.

The present invention is now illustrated in further detail by referring to the following Examples and Comparative Examples, but it should be understood that the present invention is not to be construed as being limited thereto. The adjustment of the catalysts was conducted under atmospheric pressure. Unless otherwise indicated, all the percents and parts in the following are by weight.

EXAMPLE 1

A solution comprising 2000 cc of sec-butanol having dissolved therein 180.9 g (0.7344 mol) of aluminum sec-butoxide and 54.972 g (0.1543 mol) of cobalt(II) acetylacetonate was stirred at 80° C. for an hour in an Erlenmeyer flask. Separately, 51.679 g (0.04182 mol) of ammonium para-molybdate was dissolved in 280 g of ion exchanged water by vigorously stirring at about 80° C. for 5 minutes. The resulting aqueous solution was added dropwise to the sec-butanol solution prepared above while stirring, and there was observed the precipitation of a purple-colored gelatin-like product. With further stirring, a slightly purple-colored milky white slurry was obtained. Further, the slurry was stirred for 3 more hours at 80° C. The slurry after separation by filtration was heated to obtain a dry gel, which was molded with an extruder into a bar 1.6 mm (1/16 inch) in diameter. The molding was heat treated in a muffle furnace (air oven) at 500° C. for 4 hours to obtain a metal oxide composite (Catalyst $A_1$) of $CoO(15\%)$-$MoO_3(45\%)$-$Al_2O_3(40\%)$.

EXAMPLE 2

A metal oxide composite (Catalyst $A_2$) of $CoO(10\%)$-$MoO_3(40\%)$-$Al_2O_3(50\%)$ was obtained in the same manner as in Example 1, except for using 180.9 g (0.7344 mol) of aluminum sec-butoxide, 29.318 g (0.100 mol) of cobalt (II) acetylacetonate and 36.750 g (0.02973 mol) of ammonium para-molybdate.

EXAMPLE 3

A metal oxide composite (Catalyst $A_3$) of $CoO(5\%)$-$MoO_3(15\%)$-$Al_2O_3(80\%)$ was obtained in the same manner as in Example 1, except for using 180.9 g (0.7344 mol) of aluminum sec-butoxide, 9.163 g (0.03136 mol) of cobalt (II) acetylacetonate and 8.613 g (0.006969 mol) of ammonium para-molybdate.

COMPARATIVE EXAMPLE 1

(Conventional Impregnation Process)

4.7 g of ammonium molybdate was dissolved in 14.5 ml of ion exchanged water in a flask. Therein, 20 g of an alumina carrier (substantially comprising γ-alumina, columnar product: 1/16 inch) having a pore volume of 0.7123 ml/g and a specific surface area was immersed. After air-dried for 1 hour, the carrier was calcined in a muffle furnace at 500° C. for 10 hours. The carrier was then immersed in an aqueous solution containing 5 g of cobalt nitrate dissolved in 14.5 mol of ion exchanged water to thereby obtain a carrier carrying cobalt. After air-dired, the cobalt-carrying carrier was calcined at 500° C. for 10 hours to obtain a catalyst of $CaO(5\%)$-$MoO_3(15\%)$-$Al_2O_3(80\%)$ (Catalyst a).

COMPARATIVE EXAMPLE 2

(Conventional Wet Mixing Process)

Figure 10:
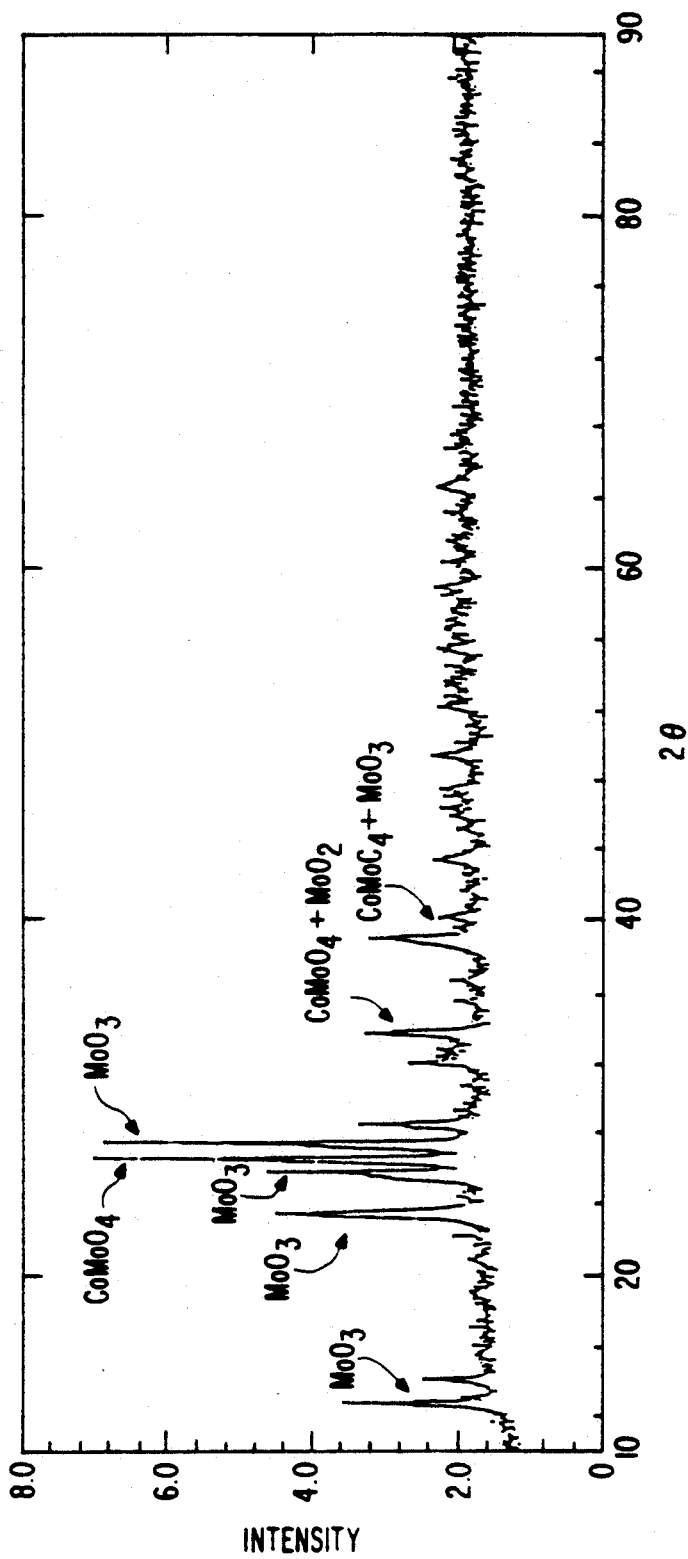

46.0646 g of ammonium molybdate was dissolved in 100 ml of ion exchanged water and adjusted pH to 5.0 using nitric acid. Thereto, an aqueous solution of 49 g of cobalt nitrate in 64 g of ion exchanged water was added. To the resulting mixture, 33.814 g of alumina (which was the same as used in Comparative Example 1) was immersed, and allowed to stand for one day. Thereafter, the water content was evaporated to dryness at 150° C. On analyzing X-ray diffraction, it was found that only a part of molybdenum and cobalt was carried on alumina, but excess molybdenum and cobalt are in the form of a powder of molybdenum trioxide or cobalt molybdate which had been released from alumina (FIG. 10).

COMPARATIVE EXAMPLE 3

(Physical Mixing Process)

5 g of cobalt oxide, 15 g of molybdenum trioxide and 80 g of alumina (which was the same as used in Comparative Example 1) were physically mixed. To the mixture, 150 g of ion exchanged water was added and fully kneaded using a kneader. After air-dried, the resulting product was calcined at 500° C. for 2 hours. The calcined product was round to 10 to 32 meshes in a mortar, thereby a metal oxide composite of $CoO(5\%)$-$MoO_3(15\%)$-$Al_2O_3(80\%)$ (Catalyst $b_1$) was obtained.

COMPARATIVE EXAMPLE 4

(Physical Mixing Process)

A metal oxide composite (Catalyst $b_2$) of $CoO(12\%)$-$MoO_3(32\%)$-$Al_2O_3(56\%)$ was obtained in the same manner as in Comparative Example 3, except for using 12 g of cobalt oxide, 32 g of molybdenum trioxide and 56 g of alumina (which was the same as used in Comparative Example 1).

COMPARATIVE EXAMPLE 5

(Physical Mixing Process)

A metal oxide composite (Catalyst $b_3$) of $CoO(15\%)$-$MoO_3(45\%)$-$Al_2O_3(40\%)$ was obtained in the same manner as in Comparative Example 3, except for using 15 g of cobalt oxide, 45 g of molybdenum trioxide and 40 g of alumina (which was the same as used in Comparative Example 1).

COMPARATIVE EXAMPLE 6

(Beaty's Process, U.S. Pat. No. 3,900,430)

1 kg of aluminum i-propoxide and 10 kg of ion exchanged water were poured to 200 liter of a reaction vessel. The mixture was heated to 80° C. and hydrolyzed for 12 hours. Thereafter, the temperature was lowered to ordinary temperature, 90 kg of i-propanol was poured to the reaction vessel, and stirred for 12 hours at ordinary temperature. The obtained slurry was filtered and condensed by heating to obtain a dry gel, which was molded with an extruder into a bar 1.6 mm (1/16 inch) in diameter. The molding was dried at 120° C. for 2 hours and heat-treated in a muffle furnace at 500° C. for 4 hours. This alumina has a surface area of 309 m²/g and a pore volume of 1.18 ml/g.

Next, 48 g of molybdenum trioxide was dissolved in 100 ml of 5% aqueous ammonia solution. To the resulting solution, nitric acid was added to adjust pH to about 5.0. To this aqueous solution, 64 g of ion exchanged water and 49 g of cobalt nitrate hexahydrate were added. To the resulting mixture, 250 g of the columnar, alumina product prepared above was added.

After immersion for overnight, drying was conducted at 121° C. for 2 hours and calcining was conducted at 482° C. for 2 hours to obtain a metal oxide composite (Catalyst c) of $CoO(4\%)$-$MoO_3(15\%)$-$Al_2O_3(81\%)$.

COMPARATIVE EXAMPLE 7

The carrying of Co (15%) and Mo (45%) was tried in the same manner as in Comparative Example 5, except that 144 g of molybdenum trioxide was dissolved in 300 ml of 5% aqueous ammonia solution, the pH was adjusted to about 5.0, and to the resulting aqueous solution, 240 g of ion exchanged water and 183.75 g of cobalt nitrate hexahydroxide were added. But, the carrying was impossible.

COMPARATIVE EXAMPLE 8

(Kemp's Process, U.S. Pat. No. 4,820,680)

To 877 g of 27% sulfuric acid was added 113 g of gibbside (34% LOI), and the resulting product was heated to 100° C. or higher to thereby dissolve gradually the gibbside into the acid solution. The temperature of the solution was lowered to 60° C. to obtain 990 g of aqueous aluminum sulfate solution.

To 482 g of 36% sodium hydroxide was added 282 g of gibbside (34% LOI), and the resulting product was heated to 115° C. or higher to thereby dissolve gradually the gibbsite into the solution. The temperature of the solution was lowered to 60° C. to obtain 764 g aqueous sodium aluminate solution.

Then, to a vessel charged wherein 1400 g of ion exchanged water at 60° C. were gradually added dropwise over 45 minutes to the two solutions so that the final pH of the solution be 7. 135 g of aqueous sodium aluminate solution was titrated to the resulting slurry in excess to thereby elevate the pH to 10. Finally, the aqueous aluminum sulfate solution added amounted to 667 g in total and the aqueous sodium aluminate solution amounted to a total of 549 g.

After aging the slurry thus obtained for an hour, it was subjected to vacuum filtration and washed with ion exchanged water to obtain an alumina hydrogel.

Into 50 ml of ion exchanged water was dissolved in 24.847 g of cobalt nitrate. Separately, to a mixed solvent comprising 11.9 ml of 30% hydrogen peroxide, 6.733 g of monoethanolamine, and 150 ml of ion exchanged water was dissolved 39.213 g of ammonium heptamolybdate. The resulting two solutions were mixed to obtain a homogenous solution.

The resulting homogenous aqueous solution was allowed to react pH 6 for 2 hours with 530 g (LOI 75.5%, 130 g dry weight) of alumina hydrogel. The pH was adjusted by adding hydrochloric acid.

The slurry was filtrated, and the solvent was removed with 200 ml of ion exchanged water under reduced pressure. The resulting product was dried forcibly at 120° C. until the LOI become about 60%, and after kneading for 15 minutes, the product was extruded and calcined at 510° C. for 2 hours to obtain a metal oxide composite (Catalyst $d_1$) of CoO(4%)-$MoO_3$(17%)-$Al_2O_3$(79%).

COMPARATIVE EXAMPLE 9

To 100 ml of ion exchanged water was dissolved 176.1 g of cobalt nitrate. Separately, a solution was obtained by dissolving 171.7 g of ammonium heptamolybdate into a mixed solvent comprising 50 ml of 30% hydrogen peroxide, 27 g of monolthanolamine, and 600 ml of ion exchanged water. The two solutions thus obtained were mixed together to obtain a homogenous solution.

The homogenous solution thus obtained was allowed to react with 530 g (LOI 75.5%, 130 g dry weight) of alumina hydrogel at pH 6 for 2 hours. The pH was adjusted by adding hydrochloric acid. The water in excess was removed by evaporation, the resulting gel was dried at 120° C. until the LOI became about 60%, and after kneading for 15 minutes, the product was extruded and calcined at 510° C. for 2 hours to obtain a metal oxide composite (catalyst $d_2$) of CoO(15%)-$MoO_3$(45%)-$Al_2O_3$(40%).

The physical properties of these examples are tabulated in Table 1.

TABLE 1

|  | Cat. | CoO (%) | $MoO_3$ (%) | $Al_2O_3$ (%) | S.A.*1 ($m^2/g$) | P.V.*2 (ml/g) | C.B.D*3 (g/ml) |
|---|---|---|---|---|---|---|---|
| Example 1 | $A_1$ | 15 | 45 | 40 | 237 | 0.50 | 0.79 |
| Example 2 | $A_2$ | 10 | 40 | 50 | 245 | 0.42 | 0.78 |
| Example 3 | $A_3$ | 5 | 15 | 80 | 342 | 0.61 | 0.74 |
| Comp. Ex. 1 | a | 5 | 15 | 80 | 266 | 0.55 | 0.78 |
| Comp. Ex. 3 | $b_1$ | 5 | 15 | 80 | 266 | 0.76 | 0.72 |
| Comp. Ex. 4 | $b_2$ | 12 | 32 | 56 | 138 | 0.39 | 0.86 |
| Comp. Ex. 5 | $b_3$ | 15 | 45 | 40 | 127 | 0.52 | 1.12 |
| Comp. Ex. 6 | c | 4 | 15 | 81 | 252 | 0.94 | 0.58 |
| Comp. Ex. 8 | $d_1$ | 4 | 17 | 79 | 302 | 0.28 | 0.87 |
| Comp. Ex. 9 | $d_2$ | 15 | 45 | 40 | 166 | 0.31 | 0.85 |

*1 Surface Area
*2 Pore volume
*3 Compacted Bulk Density

The results of desulfurization of these examples are shown in Table 2. The desulfurization was conducted under the conditions described below.

TABLE 2

| Catalyst |  | Residual Sulfur Content (%) | Desulfurization Rate (%) |
|---|---|---|---|
| Example 1 | $A_1$ | 0.07 | 94.8 |
| Example 2 | $A_2$ | 0.08 | 94.1 |
| Example 3 | $A_3$ | — | — |
| Comp. Ex. 1 | a | 0.13 | 90.4 |
| Comp. Ex. 2 | — | — | — |
| Comp. Ex. 3 | $b_1$ | 0.88 | 34.6 |
| Comp. Ex. 4 | $b_2$ | — | — |
| Comp. Ex. 5 | $b_3$ | 0.56 | 58.5 |
| Comp. Ex. 6 | c | 0.18 | 86.7 |
| Comp. Ex. 7 | — | — | — |
| Comp. Ex. 8 | $d_1$ | 0.16 | 88.4 |
| Comp. Ex. 9 | $d_2$ | 0.18 | 86.7 |

X-Ray Diffraction (XRD) Analysis

Figure 2:
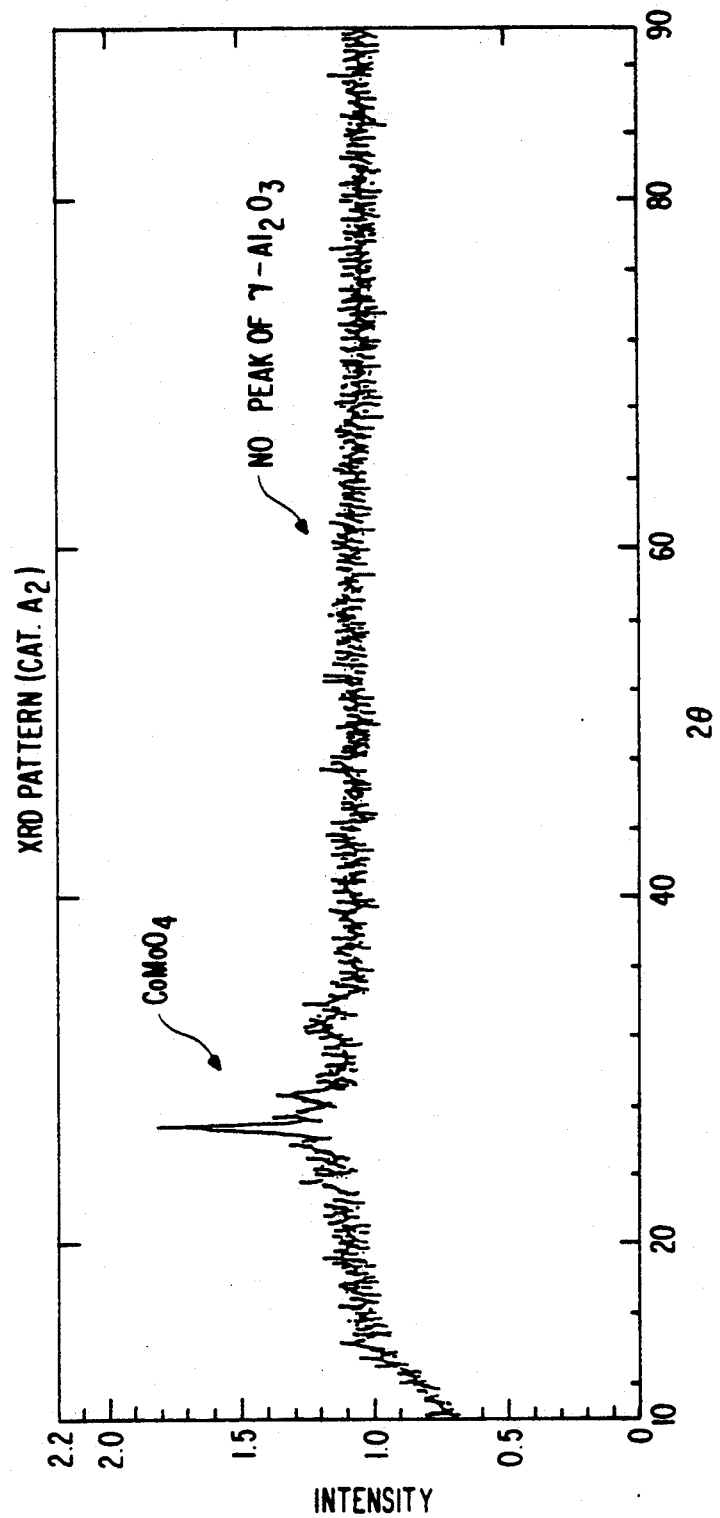
Figure 3:
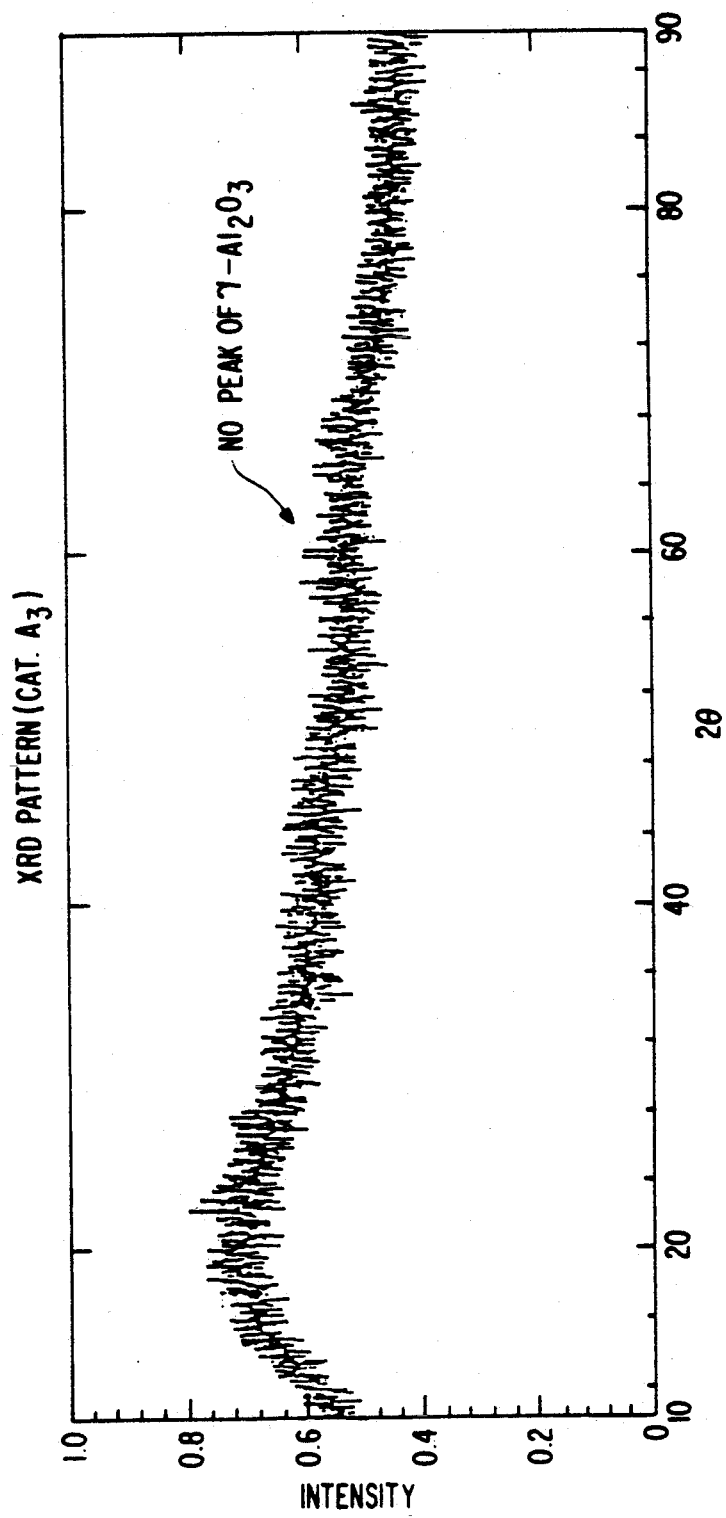

In FIGS. 1, 2 and 3 are given the X-ray diffractograms of the catalysts $A_1$, $A_2$ and $A_3$ prepared according to the present invention. When the active metal was carried in a large amount, the peak of $CoMoO_4$ is identified. However, no XRD peaks assigned to $\gamma$-$Al_2O_3$ can be observed in both of the catalysts having carried thereon a large or small amount of active material.

Figure 4:
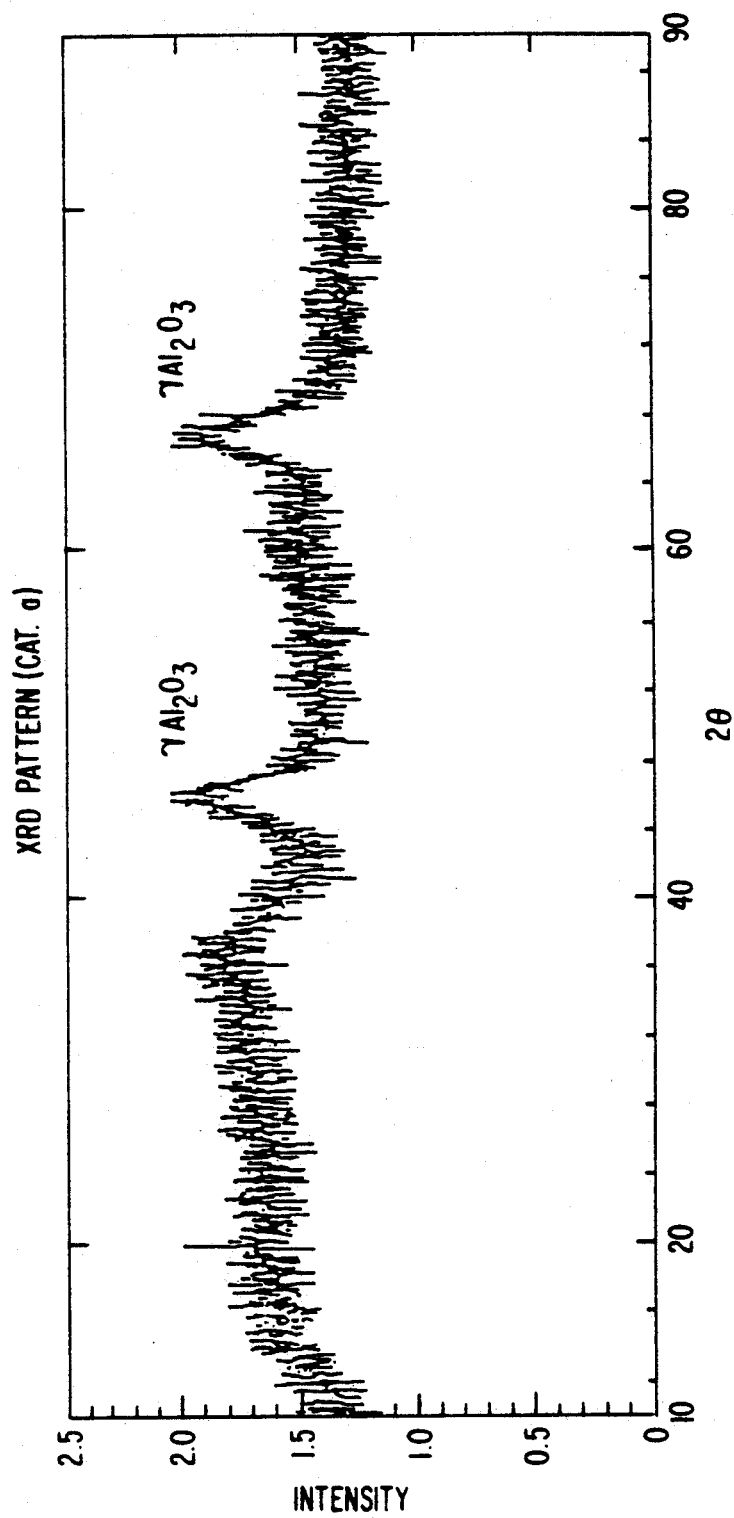

FIG. 4 shows an XRD pattern for the Catalyst a by an impregnation method, carrying thereon a small amount of active metal. The peak of $\gamma$-$Al_2O_3$ can be identified. Since none of the Catalysts $A_1$, $A_2$ and $A_3$ according to the present invention yield a peak ascribed to $\gamma$-$Al_2O_3$, the structure of the Catalysts $A_1$, $A_2$ and $A_3$ can be distinguished from that of the Catalyst a.

Figure 5:
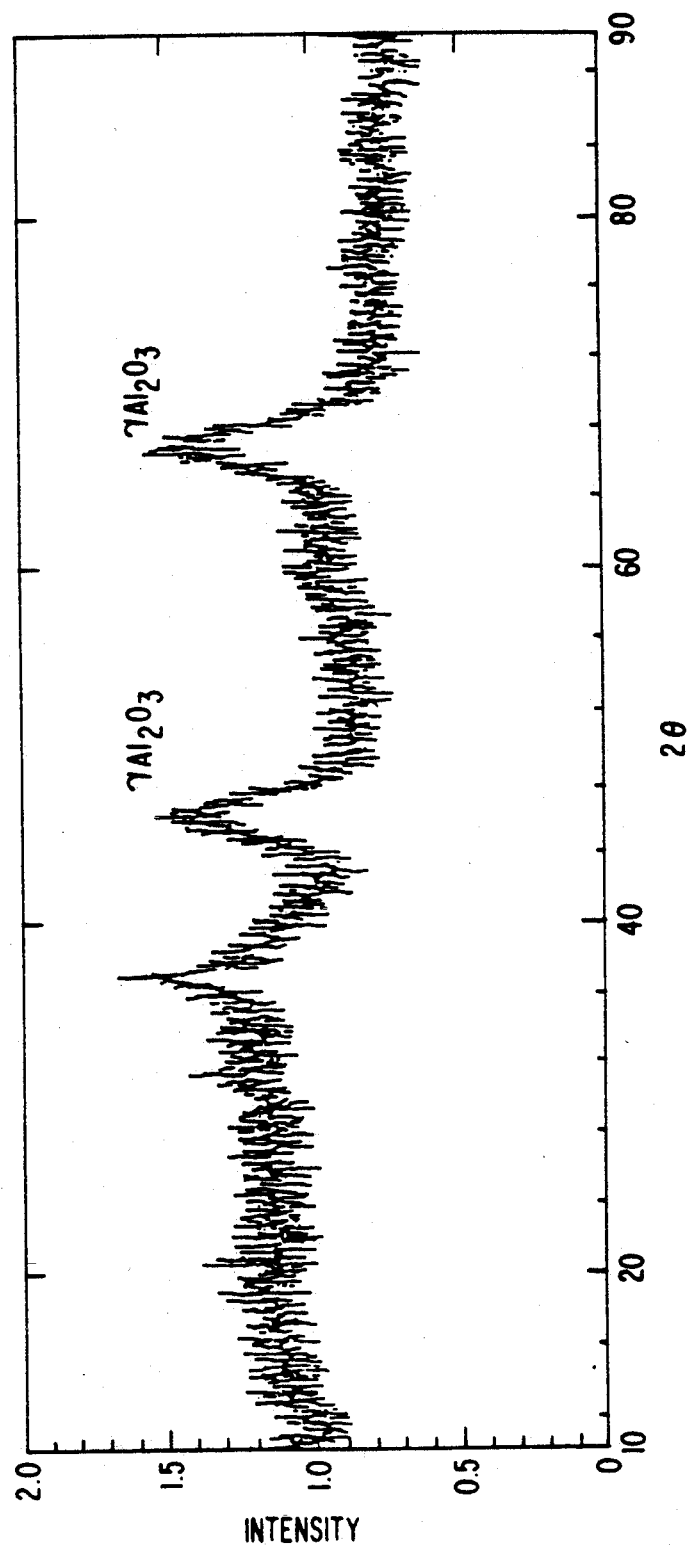
Figure 6:
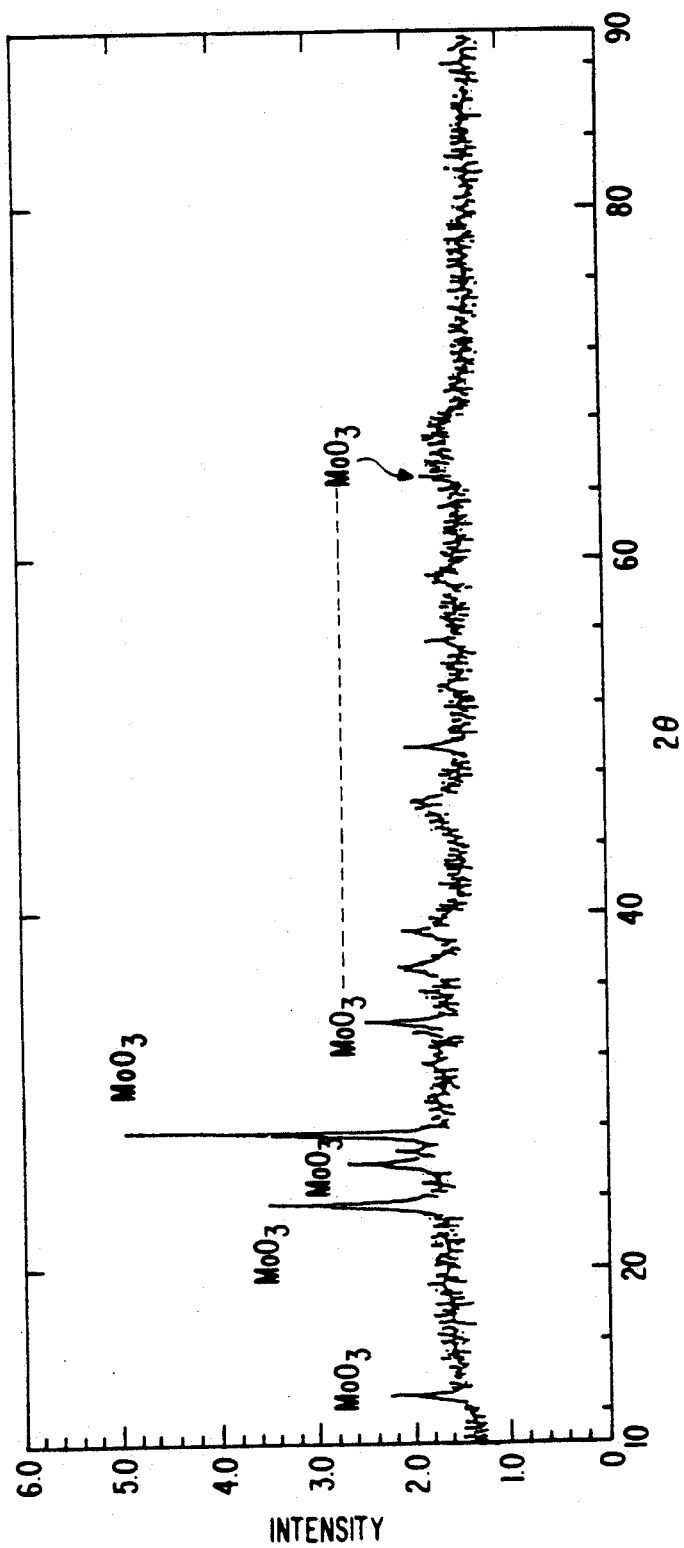
Figure 7:
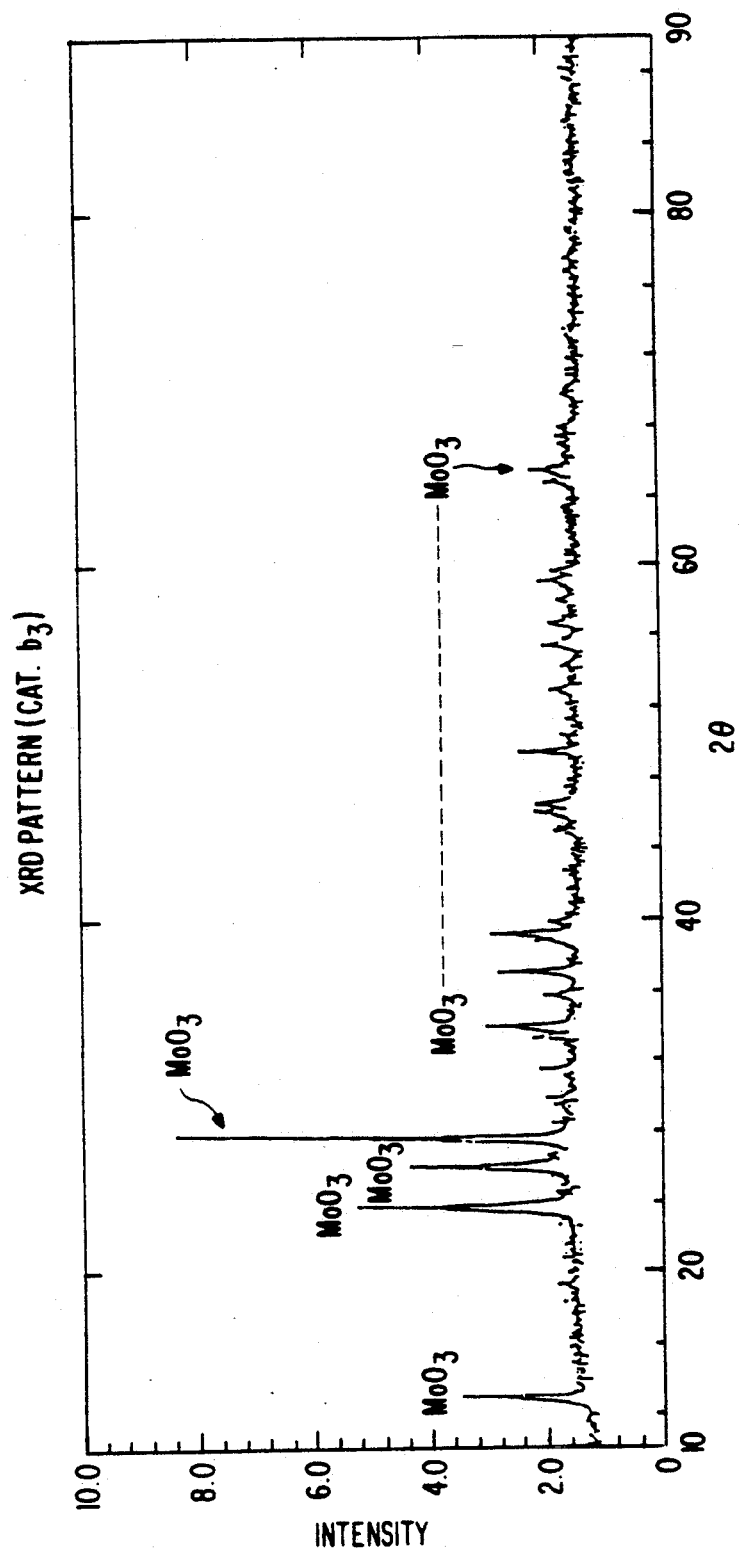

FIGS. 5, 6 and 7 respectively show the X-ray diffractograms for the Catalysts $b_1$, $b_2$ and $b_3$ obtained by a physical mixing process. Distinct peaks assigned to $\gamma$-$Al_2O_3$ can be observed in diffractograms of the catalysts having carried thereon a small amount of active metal. The Catalyst $b_2$ which carried a large amount of active metal yield peaks identified as molybdenum oxide in its X-ray diffractogram. It can be concluded therefrom that the Catalysts $b_1$, $b_2$ and $b_3$ also are different from the catalysts according to the present invention in structure.

Figure 8:
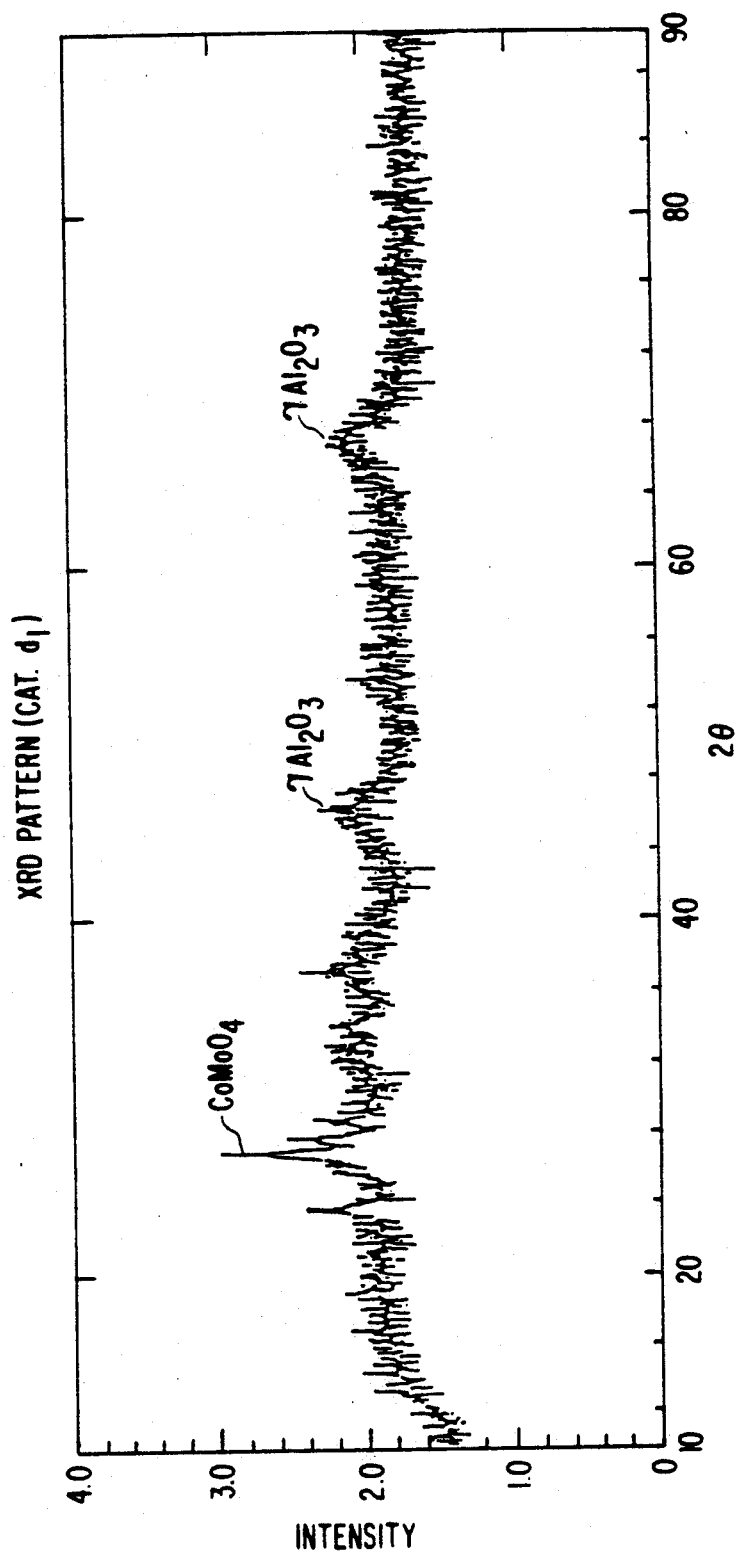
Figure 9:
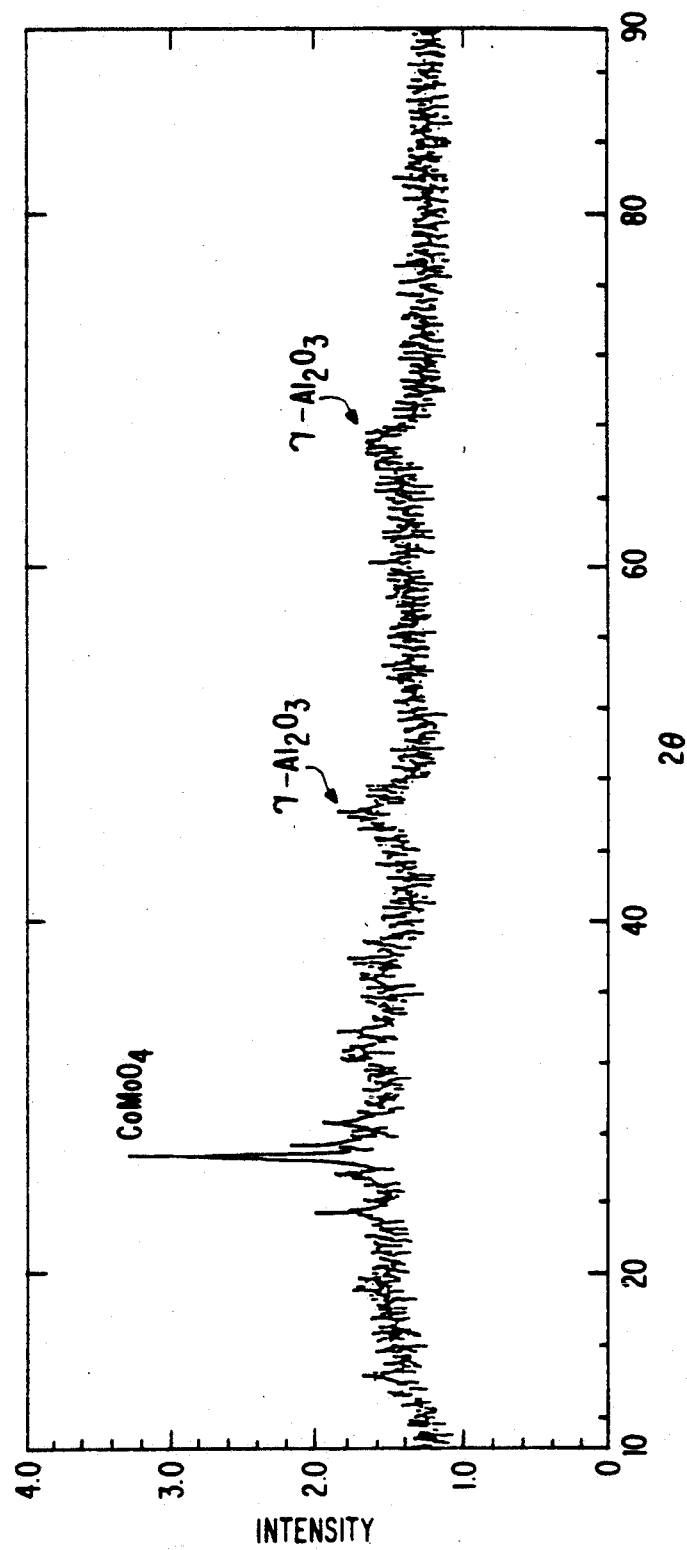

FIGS. 8 and 9 are the X-ray diffraction patterns for the Catalysts $d_1$ and $d_2$ according to the Kemp's process (U.S. Pat. No. 4,820,680). In both catalysts carrying thereon a large amount and a small amount of active metal can be observed the presence of $CoMoO_4$ as well as $\gamma$-$Al_2O_3$. Since no peak of $\gamma$-$Al_2O_3$ can be observed in the catalysts according to the present invention, it can be clearly understood that the structure of the catalyst according to the present invention is distinguished from that of the Kemp's catalyst.

The XRD was obtained using RINT of Rigaku Denki K. K. The measurement was conducted under the conditions of: a copper radiation operating at 40 kV-30 mA, using a wide angle goniometer, sampling width of 0.020°, scanning at a rate of 4.000°/min, divergence slit of 0.30 mm, receiving slit of 1°, automatic sample charger, 10 r.p.m., filter Ni, scan range of 10° to 90°.

IR Analysis-NO Adsorption Test

In practice, Mo-based sulfide catalyst accompany Co, Ni, etc., as the auxiliary catalyst to accelerate the catalytic activity of the main Mo-based catalyst. The effect of the auxiliary catalysts is explained by various models based on the single crystal structure of molybdenum disulfide. For instance, Topse, H et al explain that a sulfidized Co-Mo/$Al_2O_3$ adsorbs NO, and that cobalt which adsorbs NO is closely related with the hydrodesulfurization activity (Topse, H. and Clausen, B. S., Catal. Rev.-Sci. Eng., 26 (3&4), 395 (1984)).

To evaluate the amount of adsorbed NO on cobalt, a sulfidized catalyst having subjected to NO adsorption was analyzed by diffusion-reflection FTIR (FIG. 11 for the scheme of the apparatus and FIG. 12 for the operation steps for analysis). The FTIR was measured by using FTIR-8100M (Shimazu Corp.) and in situ diffusion-reflection type cell (Spectratech Co.). According to the flow of FIG. 12, the IR was measured after sulfurization and NO adsorption of catalyst. Typical IR spectrum is shown in FIG. 13.

Figure 14:
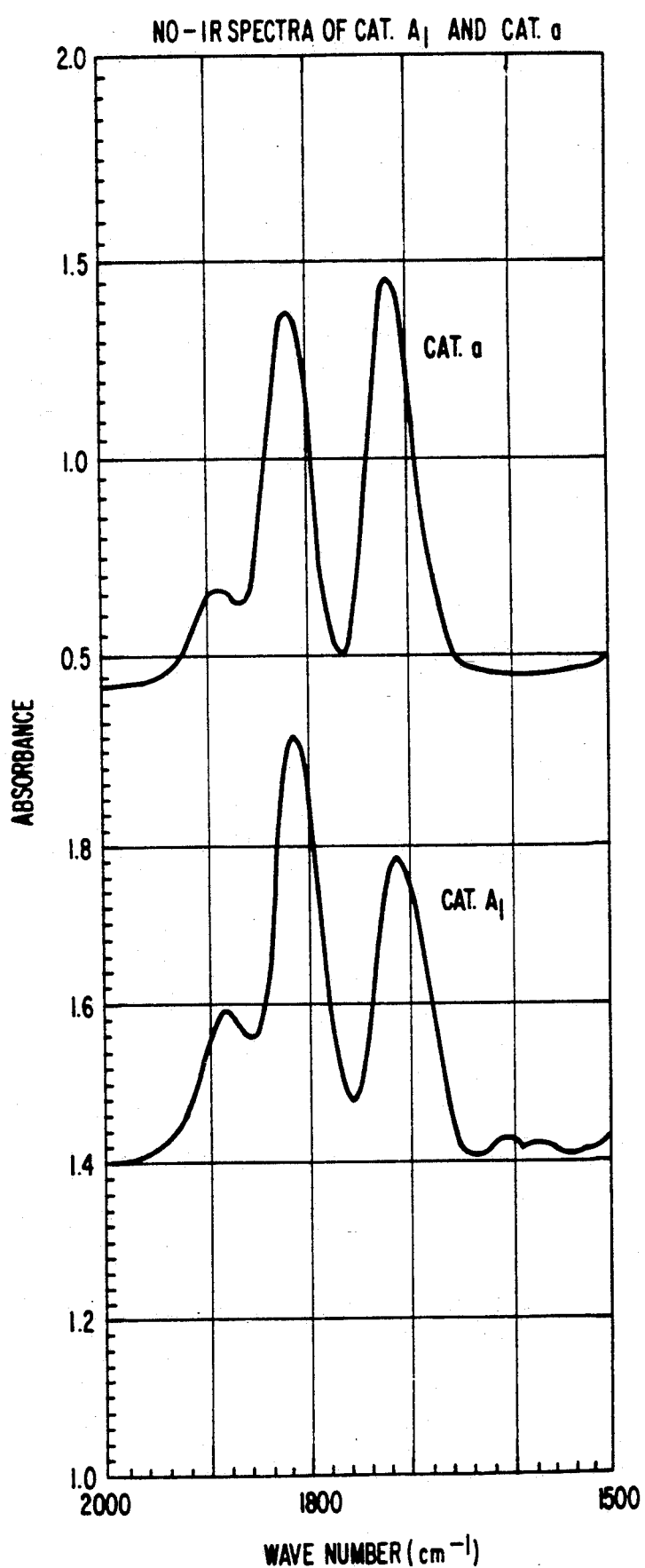

The upper spectrum in FIG. 14 shows the result of the Catalyst a used in practice. The band at wavenumber 1710 $cm^{-1}$ is assigned to NO adsorbed on molybdenum, and that at 1880 $cm^{-1}$ is assigned to NO adsorbed on cobalt. The band at 1810 $cm^{-1}$ is assigned to NO adsorbed on both cobalt and molybdenum. The results clearly indicate that in the Catalyst a, NO is more adsorbed on molybdenum which is known to have less influence in increasing the catalyst activity, but not on cobalt which more affects the catalyst activity. In contrast, the Catalyst $A_1$ according to the present invention adsorbs larger amount of NO on cobalt than on molybdenum.

It can be therefore concluded that the catalyst according to the present invention is larger in population of active sites as compared to the conventional catalysts.

From the results, it has been clarified that the conventional processes (inclusive of the Morimoto's process, U.S. Pat. No. 4,012,340), as well as the Kemp and Beaty processes suffer difficulty in producing catalysts having carried thereon active metals at a content as high as that of the catalysts according to the present invention. Even if a catalyst carrying a high amount of active metals (i.e., catalysts containing with respect to the total weight of the catalyst, 15 wt % of cobalt and 45 wt % of molybdenum, in terms of oxides) were to be prepared, the desulfurization activity thereof is far lower than those commonly used in the art (i.e., those prepared by the impregnation method; containing 5 wt % of cobalt and 15 wt % of molybdenum with respect to the total weight of the catalyst, in terms of oxides). It is confirmed further by X-ray diffraction and FTIR analysis that the catalysts according to the present invention are structually different from other catalysts known in the art.

Accordingly, the present invention provides catalysts not only differed in properties as compared with the conventional catalysts, but also having a far increased hydrodesulfurization activity.

EXAMPLE 4

A solution comprising 2000 cc of iso-propanol having dissolved therein 180.9 g (0.7344 mol) of aluminum sec-butoxide and 54.972 g (0.1543 mol) of cobalt(II) acetylacetonate was stirred at 80° C. for an hour in an Erlenmeyer flask. Separately, 51.679 g (0.04182 mol) of ammonium para-molybdate was dissolved in 280 g of ion exchanged water by vigorously stirring at about 80° C. The resulting aqueous solution was added dropwise to the iso-propanol solution prepared above while stirring, and there was observed the precipitation of a purple-colored gelatin-like product. With further stirring, a slightly purple-colored milky white slurry was obtained. The slurry was stirred for 3 more hours at 80° C. The slurry was charged in a flask, and was subjected to reduced pressure at 100° C. for 30 minutes using a rotary evaporator to remove the solvent. A dry gel was obtained as a result, which was molded with an extruder into a bar 1.6 mm (1/16 inch) in diameter. The molding was heat treated in a muffle furnace at 500° C. for 3 hours to obtain a metal oxide composite (Catalyst B) of $CoO(15\%)$-$MoO_3(45\%)$-$Al_2O_3(40\%)$.

EXAMPLE 5

A metal oxide composite (Catalyst C) of $CoO(15\%)$-$MoO_3(45\%)$-$Al_2O_3(40\%)$ was obtained in the same manner as in Example 4 above, except for using 150.0 g (0.7344 mol) of aluminum i-propoxide in place of 180.9 g of aluminum sec-butoxide.

EXAMPLE 6

A metal oxide composite (Catalyst D) of $CoO(15\%)$-$MoO_3(45\%)$-$Al_2O_3(40\%)$ was obtained in the same manner as in Example 4 above, except for using 95.493 g (0.29278 mol) of molybdenum oxide acetylacetonate and 54.547 g (0.04182 mol) of cobalt nitrate hexahydrate, in place of 54.972 g (0.1543 mol) of cobalt(II) acetylacetonate and 51.679 g (0.04182 mol) of ammonium para-molybdate, respectively.

EXAMPLE 7

A metal oxide composite (Catalyst E) of $CoO(15\%)$-$MoO_3(45\%)$-$Al_2O_3(40\%)$ was obtained in the same manner as in Example 4 above, except for using 20.034 g (0.154 mol) of cobalt(I) chloride in place of 54.972 g (0.1543 mol) of cobalt acetylacetonate.

EXAMPLE 8

A metal oxide composite (Catalyst F) of $CoO(15\%)$-$MoO_3(45\%)$-$SiO_2(20\%)$-$Al_2O_3(20\%)$ was obtained in the same manner as in Example 4 above, except for using 90.45 g (0.3672 mol) of aluminum sec-butoxide together with 64.930 g (0.31167 mol) of tetraethoxysilane in place of 180.9 g of aluminum sec-butoxide.

EXAMPLE 9

A metal oxide composite (Catalyst G) of $CoO(15\%)$-$MoO_3(45\%)$-$SiO_2(5\%)$-$Al_2O_3(35\%)$ was obtained in the same manner as in Example 4 above, except for using 158.288 g (0.6426 mol) of aluminum sec-butoxide together with 16.232 g (0.07791 mol) of tetraethoxysilane in place of 180.9 g of aluminum sec-butoxide.

EXAMPLE 10

A solution comprising 2000 cc of iso-propanol having dissolved therein 180.9 g (0.7344 mol) of aluminum sec-butoxide was maintained at 80° C. in an Erlenmeyer flask. Separately, 54.399 g (0.4402 mol) of ammonium para-molybdate and 54.547 g (0.1874 mol) of cobalt nitrate were dissolved in 280 g of ion exchanged water by vigorously stirring at about 80° C. The resulting aqueous solution was added dropwise while stirring, along with 3.202 g of phosphoric acid (85% concentration) to the iso-propanol solution prepared above and there was observed the precipitation of a purple-colored gelatin-like product. With further stirring, a slightly purple-colored milky white slurry was obtained. Subsequent operations were carried out in the same manner as in Example 4 to finally obtain a metal oxide composite (Catalyst H) of $CoO(15\%)$-$MoO_3(45\%)$-$P_2O_5(2\%)$-$Al_2O_3(38\%)$.

EXAMPLE 11

A metal oxide composite (Catalyst I) of $CoO(15\%)$-$MoO_3(45\%)$-$TiO_2(5\%)$-$Al_2O_3(35\%)$ was obtained in the same manner as in Example 9 above, except for using 16.653 g (0.05859 mol) of titanium isopropoxide in place of 16.232 g of tetraethoxysilane.

EXAMPLE 12

A metal oxide composite (Catalyst J) of $CoO(15\%)$-$MoO_3(45\%)$-$ZrO_2(5\%)$-$Al_2O_3(35\%)$ was obtained in the same manner as in Example 9 above, except for using 12.431 g (0.03799 mol) of zirconium n-propoxide in place of 16.232 g of tetraethoxysilane.

EXAMPLE 13

A metal oxide composite (Catalyst K) of $CoO(10\%)$-$MoO_3(40\%)$-$Al_2O_3(50\%)$ was obtained in the same manner as in Example 4 above, except for reducing the amount of cobalt(II) acetylacetonate from 54.972 g to 29.40 g (0.0825 mol), and the amount of ammonium paramolybdate from 51.679 g to 36.70 g (0.0297 mol).

EXAMPLE 14

A metal oxide composite (Catalyst L) of $CoO(10\%)$-$MoO_3(53\%)$-$Al_2O_3(37\%)$ was obtained in the same manner as in Example 4 above, except for reducing the amount of cobalt(II) acetylacetonate from 54.972 g to 39.60 g (0.1120 mol) while increasing the amount of ammonium para-molybdate from 51.679 g to 65.80 g (0.0532 mol), and using 2,000 cc of sec-butanol in place of i-propanol.

COMPARATIVE EXAMPLE 10

In an eggplant-shaped flask there was prepared a solution by dissolving 4.7 g of ammonium molybdate in 14.5 ml of ion exchanged water, and to the resulting solution was immersed 20 g of an alumina carrier (substantially comprising $\gamma$-$Al_2O_3$) having a specific pore volume of 0.7123 ml/g and a specific surface area of 336 m$^2$/g. After immersion for a duration of 1 hour, the carrier was withdrawn from the solution, air dried, and calcined at 500° C. for 10 hours in a muffle furnace. The carrier was then immersed in an aqueous solution containing 5 g of cobalt nitrate dissolved in 14.5 ml of ion exchanged water to thereby obtain a carrier carrying cobalt. The cobalt-carrying carrier was air dried and calcined at 500° C. for 10 hours to obtain a catalyst of $CoO(5\%)$-$MoO_3(15\%)$-$Al_2O_3(80\%)$ (Catalyst T) having a specific surface area of 266 m$^2$/g and a specific pore volume of 0.5478 cc/g.

COMPARATIVE EXAMPLE 11

A metal oxide composite (Catalyst U) of $CoO(2\%)$-$MoO_3(5\%)$-$Al_2O_3(93\%)$ was obtained in the same manner as in Example 4 above, except for reducing the amount of cobalt(II) acetylacetonate from 54.972 g (0.1543 mol) to 3.150 g (0.00884 mol) and that of ammonium paramolybdate from 51.679 g (0.04182 mol) to 2.47 g (0.00199 mol).

COMPARATIVE EXAMPLE 12

A metal oxide composite (Catalyst V) of $CoO(25\%)$-$MoO_3(75\%)$ was obtained in the same manner as in Example 4 above, except for increasing the amount of cobalt(II) acetylacetonate from 54.972 g (0.1543 mol) to 109.9 g (0.3748 mol) and that of ammonium p-molybdate from 51.679 g (0.04182 mol) to 103.4 g (0.08367 mol), while not using aluminum sec-butoxide.

COMPARATIVE EXAMPLE 13

A solution comprising 2000 cc of iso-propanol having dissolved therein 180.9 g (0.7344 mol) of aluminum sec-butoxide was stirred at 80° C. for one hour in an Erlenmeyer flask. Separately, 2.47 g (0.001998 mol) of ammonium para-molybdate was dissolved in 280 g of ion exchanged water by vigorously stirring while heating. The resulting aqueous solution was dropwise added while stirring to the iso-propanol solution prepared above and the formation of a milky white slurry was observed. The slurry was stirred for 3 more hours at 80° C. The slurry after separation by filtration was heated for condensation to obtain a dry gel, which was molded with an extruder into a bar 1.6 mm (1/16 inch) in diameter. The molding was heat treated in a muffle furnace at 500° C. for 4 hours.

The heat treated molding was immersed into an aqueous solution prepared by dissolving 3.13 g (0.01076 mol) of cobalt nitrate hexahydrate in 25 ml of ion exchanged water to thereby obtain a molding carrying thereon cobalt. The molding was air dried, and further calcined at 500° C. for 10 hours to obtain a metal oxide composite (Catalyst W) of $CoO(2\%)$-$MoO_3(5\%)$-$Al_2O_3(93\%)$.

COMPARATIVE EXAMPLE 14

An attempt was made to prepare a catalyst carrying 10% of cobalt and 35% molybdenum (in terms of oxides) with respect to the total catalyst by a conventional impregnation method. First, an attempt was made to dissolve ammonium para-molybdate in water taken equivolume with the specific pore volume, 0.7123 ml/g (specific surface area: 336 m$^2$/g), but it remained insoluble despite heating or the addition of ammonia. The same operation was repeated for cobalt nitrate, which gave the same result. Accordingly, it can be seen that a catalyst prepared by a conventional processes is not capable of carrying a large amount of active metals.

Each of the catalysts A$_1$, B to L, and T to W prepared in Examples 1 and 4 to 12 and Comparative Examples 10 to 13 was used to hydrodesulfurize hydrocarbon oil under the following operating conditions, and each of the catalysts was evaluated according to the methods as follows. (Hydrodesulfurization of Gas Oil)

Raw material: LGO (Specific gravity (15/4° C.):0.851; Sulfur content: 1.35%; Nitrogen content: 20 ppm; Viscosity (at 30° C.): 5.499 cSt.)

Reaction conditions: Temperature: 350° C.; Hydrogen Pressure: 35 kg/cm$^2$; Liquid hourly space velocity: 4 hr$^{-1}$; Apparatus: Fixed-bed type high pressure flow reactor; Catalyst: Catalysts A$_1$, B, C, E, H, I, J, T, U, V, and W.

Evaluation method: Sulfur content of the product oil after operating the reaction under the above conditions for 100 hours or for 60 days was analyzed. The results are given in Tables 4 and 7. Furthermore, the FIG. 15. presents changes in residual sulfur with the passage of time for Catalysts A$_1$, B, C, and T. (Hydrodesulfurization of VGO)

Raw material: VGO (Specific gravity (15/4° C.): 0.916; Sulfur content: 2.53%; Nitrogen content: 780 ppm; Viscosity (at 30° C.): 28.8 cSt.)

Reaction conditions: Temperature: 350° C.; Hydrogen Pressure: 52 kg/cm$^2$; Liquid hourly space velocity: 0.4 hr$^{-1}$; Apparatus: Fixed-bed type high pressure flow reactor; Catalyst: Catalysts A$_1$, B, C, E, F, H, I, J, T, U, V, and W.

Evaluation method: Sulfur content of the product oil after operating the reaction under the above conditions for 100 hours was analyzed. The results are given in Tables 5 and 8.

(Hydrodesulfurization of Heavy Oil)

Raw material: Topped crude obtained from a crude oil from Kuwait (Specific gravity (15/4° C.): 0.956; Sulfur content: 3.77%; Asphaltene content: 3.9%; Vanadium content: 48 ppm; Nickel content: 14 ppm)

Reaction conditions: Temperature: 361° C.; Hydrogen Pressure: 150 kg/cm$^2$; Hydrogen/hydrocarbon oil ratio: 830 Nm$^3$/Kl; Hydrogen concentration: 90 mol %; Liquid hourly space velocity: 1.0 hr$^{-1}$; Apparatus: Fixed-bed type high pressure flow reactor; Catalyst: Catalysts A$_1$, B, C, D, J, K, L, T, U, and V.

Evaluation method: Sulfur content of the product oil after operating the reaction under the above conditions for 100 hours was analyzed. The results are given in Tables 6 and 9.

While the invention has been described in detail and with reference to specific embodiments thereof, it will be apparent to one skilled in the art that various changes and modifications can be made therein without departing from the spirit and scope thereof.

TABLE 3

| | Starting Material[1)] | | | Catalyst Composition (wt %) | | Specific Surface Area (m$^2$/g) | Specific Pore Volume (cc/g) | Catalyst |
|---|---|---|---|---|---|---|---|---|
| Ex. 1 | Aluminum sec-butoxide<br>Cobalt acetylacetate | (180.9 g)<br>(55.0) | sec-Butanol<br>(2000 cc) | Ammonium p-molybdate (51.7) | CoO (15)<br>MoO$_3$ (45)<br>Al$_2$O$_3$ (40) | 237 | 0.5 | A$_1$ |
| Ex. 4 | Aluminum sec-butoxide<br>Cobalt acetylacetate | (180.9)<br>(55.0) | i-Propanol<br>(2000 cc) | ↑ | CoO (15)<br>MoO$_3$ (45)<br>Al$_2$O$_3$ (40) | 242 | 0.51 | B |
| Ex. 5 | Aluminum i-propoxide<br>Cobalt acetylacetonate | (150.0)<br>(55.0) | ↑ | ↑ | CoO (15)<br>MoO$_3$ (45)<br>Al$_2$O$_3$ (40) | 218 | 0.49 | C |
| Ex. 6 | Aluminum sec-butoxide<br>Molybdenumoxide acetylacetonate | (180.9)<br>(95.5) | ↑ | Cobalt nitrate (55.0) | CoO (15)<br>MoO$_3$ (45)<br>Al$_2$O$_3$ (40) | 133 | 0.36 | D |
| Ex. 7 | Aluminum sec-butoxide<br>Cobalt chloride | (180.9)<br>(20.0) | ↑ | Ammonium p-molybdate (51.7) | CoO (15)<br>MoO$_3$ (45)<br>Al$_2$O$_3$ (40) | 100 | 0.60 | E |
| Ex. 8 | Aluminum sec-butoxide<br>Tetraethoxysilane<br>Cobalt acetylacetonate | (90.5)<br>(64.9)<br>(55.0 | ↑ | ↑ | CoO (15)<br>MoO$_3$ (45)<br>SiO$_2$ (20)<br>Al$_2$O$_3$ (20) | 157 | 0.51 | F |
| Ex. 9 | Aluminum sec-butoxide<br>Tetraethoxysilane<br>Cobalt acetylacetonate | (158.3)<br>(16.2)<br>(55.0) | ↑ | ↑ | CoO (15)<br>MoO$_3$ (45)<br>SiO$_2$ (5)<br>Al$_2$O$_3$ (35) | 188 | 0.50 | G |
| Ex. 10 | Aluminum sec-butoxide | (180.9) | ↑ | Ammonium p-molybdate (54.40)<br>Coablt nitrate (54.55)<br>Prophoric acid (3.20) | CoO (15)<br>MoO$_3$ (45)<br>P$_2$O$_5$ (2)<br>Al$_2$O$_3$ (38) | 225 | 0.48 | H |
| Ex. 11 | Aluminum sec-butoxide<br>Titanium isopropoxide<br>Cobalt acetylacetonate | (158.0)<br>(16.7)<br>(55) | ↑ | Ammonium p-molybdate (51.7) | CoO (15)<br>MoO$_3$ (45)<br>TiO$_2$ (5)<br>Al$_2$O$_3$ (35) | 213 | 0.39 | I |
| Ex. 12 | Aluminum sec-butoxide<br>Zirconium n-propoxide<br>Cobalt acetylacetonate | (158.0)<br>(12.4)<br>(55.0) | ↑ | ↑ | CoO (15)<br>MoO$_3$ (45)<br>ZrO$_2$ (5)<br>Al$_2$O$_3$ (35) | 205 | 0.42 | J |

TABLE 3-continued

| | Starting Material[1] | | | | Catalyst Composition (wt %) | | Specific Surface Area (m²/g) | Specific Pore Volume (cc/g) | Catalyst |
|---|---|---|---|---|---|---|---|---|---|
| Ex. 13 | Aluminum sec-butoxide<br>Cobalt acetylacetonate | (180.9)<br>(29.4) | ↑ | Ammonium p-molybdate (36.7) | CoO<br>MoO₃<br>Al₂O₃ | (10)<br>(40)<br>(50) | 245 | 0.42 | K |
| Ex. 14 | Aluminum sec-butoxide<br>Cobalt acetylacetonate | (180.9)<br>(39.6) | sec-Butanol<br>(2000 cc) | Ammonium p-molybdate (65.8) | CoO<br>MoO₃<br>Al₂O₃ | (10)<br>(53)<br>(37) | 213 | 0.48 | L |
| Comp. Ex. 10 | Conventional preparation by immersion process | | | | CoO<br>MoO₃<br>Al₂O₃ | (5)<br>(15)<br>(80) | 266 | 0.55 | T |
| Comp. Ex. 11 | Aluminum sec-butoxide<br>Cobalt acetylacetonate | (180.9)<br>(3.15) | i-propanol<br>(2000 cc) | Ammonium p-molybdate (2.47) | CoO<br>MoO₃<br>Al₂O₃ | (2)<br>(5)<br>(93) | 284 | 0.72 | U |
| Comp. Ex. 12 | Aluminum sec-butoxide<br>Cobalt acetylacetonate | (0)<br>(109.9) | ↑ | Ammonium p-molybdate (103.4) | CoO<br>MoO₃<br>Al₂O₃ | (25)<br>(75)<br>(0) | 116 | 0.27 | V |
| Comp. Ex. 13 | Aluminum sec-butoxide<br>i-Propanol | (180.9)<br>(2000 cc) | Ammonium p-molybdate (2.47) | Cobalt nitrate (3.13) | CoO<br>MoO₃<br>Al₂O₃ | (2)<br>(5)<br>(93) | — | — | W |

Note [1])The amount (given in the parenthesis) of the starting materials are only round figures, and given in grams unless otherwise stated. The following properties are valid for Examples 1 and 4 to 14 and for Comparative Examples 10 through 12. Average pore diameter: 73 to 108Å; Compacted bulk density: 0.76 to 0.80 g/ml; Length of cylinder: 3.2 to 3.66 mm; Diameter of cylinder: 1.4 to 1.6 mm; and Clashing strength of the side wall: 1.1 to 1.4 kg/mm (2.4 to 3.1 lbs/mm).

TABLE 4

| Test No.[1] | 1 | 2 | 3 | 4 | 5 | 6 | 7 | 8 | 9 | 10 |
|---|---|---|---|---|---|---|---|---|---|---|
| Catalyst | A₁ | B | C | E | H | I | J | T | U | V |
| Sulfur Content (wt %) | 0.07 | 0.07 | 0.08 | 0.09 | 0.09 | 0.09 | 0.09 | 0.13 | 0.28 | 0.22 |
| Desulfurization Rate (%) | 94.8 | 94.8 | 94.1 | 93.3 | 93.3 | 93.3 | 93.3 | 90.4 | 79.2 | 83.7 |

Note [1])Values for Nos. 1 to 3 and 8 are taken after 60 days of operation, and the rest are taken after an operation duration of 100 hours.

TABLE 5

| Test No.[1] | 11 | 12 | 13 | 14 | 15 | 16 | 17 | 18 | 19 | 20 | 21 |
|---|---|---|---|---|---|---|---|---|---|---|---|
| Catalyst | A₁ | B | C | E | F | H | I | J | T | U | V |
| Sulfur Content (wt %) | 0.08 | 0.08 | 0.09 | 0.11 | 0.10 | 0.10 | 0.10 | 0.10 | 0.15 | 0.18 | 0.27 |
| Desulfurization Rate (%) | 96.8 | 96.8 | 96.4 | 95.7 | 96.0 | 96.0 | 96.0 | 96.0 | 94.1 | 92.0 | 89.3 |

TABLE 6

| Test No.[1] | 22 | 23 | 24 | 25 | 26 | 27 | 28 | 29 | 30 | 31 |
|---|---|---|---|---|---|---|---|---|---|---|
| Catalyst | A₁ | B | C | D | J | K | L | T | U | V |
| Sulfur Content (wt %) | 0.67 | 0.67 | 0.71 | 0.81 | 0.76 | 0.71 | 0.76 | 0.93 | 1.44 | 1.07 |
| Desulfurization Rate (%) | 82.2 | 82.2 | 81.1 | 78.5 | 79.8 | 81.1 | 79.8 | 75.3 | 61.8 | 71.6 |

TABLE 7

| Test No.[1] | 32 | 33 |
|---|---|---|
| Catalyst | T | W |
| Sulfur Content (wt %) | 0.13 | 0.27 |

TABLE 8

| Test No.[1] | 34 | 35 |
|---|---|---|
| Catalyst | T | W |
| Sulfur Content (wt %) | 0.15 | 0.18 |

TABLE 9

| Test No.[1] | 36 |
|---|---|
| Catalyst | T |
| Sulfur Content (wt %) | 0.93 |

WHAT IS CLAIMED IS:

1. A catalyst composition for the hydrodesulfurization of a hydrocarbon oil, comprising a composite of metal oxides comprising
aluminum; and
at least one metal selected from a group consisting of
(A) at least one metal belonging to Group VIB of the Periodic Table; and
(B) at least one metal belonging to Group VIII of the Periodic Table;
where the at least one metal belonging to Group VIB of the Periodic Table accounts for, in terms of oxide, from 10 to 60% by weight with respect to the total catalyst, and the at least one metal belonging to the Group VIII of the Periodic Table accounts for, in terms of oxide, from 3 to 20% by weight with respect to the total catalyst, and wherein no peak assigned to γ-Al₂O₃ is present in X-ray diffraction.

2. The catalyst composition for the hydrodesulfurization of a hydrocarbon oil as claimed in claim 1, wherein the ratio of the height of the peak intensity in the lower wave number side by which NO is absorbed on the metals belonging to Group VIB of the Periodic Table to the height of the peak intensity in the higher wave number side by which NO is adsorbed on the metals belonging to Group VIII of the Periodic Table is from 10/2 to 1/100 in the IR spectrum of NO absorbed on the catalyst which has been subjected to sulfurization.

3. The catalyst composition for the hydrodesulfurization of a hydrocarbon oil as claimed in claim 1, wherein the ratio of the height of the peak intensity in the lower wave number side by which NO is adsorbed on the metals belonging to Group VIB of the Periodic Table to the height of the peak intensity in the higher wave number side by which NO is adsorbed on the metals belonging to Group VIII of the Periodic Table is from 10/3 to 1/10 in the IR spectrum of NO adsorbed on the catalyst which has been subjected to sulfurization.

4. The catalyst composition for the hydrodesulfurization of a hydrocarbon oil as claimed in claim 1, wherein the ratio of the height of the peak intensity in the lower wave number side by which NO is adsorbed on the metals belonging to Group VIB of the Periodic Table to the height of the peak intensity in the higher wave number side by which NO is adsorbed on the metals belonging to Group VIII of the Periodic Table is from 10/4 to 1/10 in the IR spectrum of NO adsorbed on the catalyst which has been subjected to sulfurization.

5. The catalyst composition for the hydrodesulfurization of hydrocarbon oil as claimed in claim 1, wherein the at least one metal belonging to Group VIB of the Periodic Table is chromium, molybdenum, or tungsten.

6. The catalyst composition for the hydrodesulfurization of a hydrocarbon oil as claimed in claim 1, wherein the at least one metal belonging to the Group VIII of the Periodic Table is iron, cobalt, nickel, ruthenium, rhodium, palladium, osmium, iridium, or platinum.

7. The catalyst composition for the hydrodesulfurization of a hydrocarbon oil as claimed in claim 1, wherein the at least one metal belonging to Group VIB of the Periodic Table accounts for, in terms of oxide, from about 15 to about 55% by weight with respect to the total catalyst.

8. The catalyst composition for the hydrodesulfurization of a hydrocarbon oil as claimed in claim 1, wherein the at least one metal belonging to Group VIII of the Periodic Table accounts for, in terms of oxide, from about 5 to about 18% by weight with respect to the total catalyst.

9. The catalyst composition for the hydrodesulfurization of a hydrocarbon oil as claimed in claim 1, wherein the hydrocarbon oil is a light fraction obtained by topping or vacuum distillation of crude oil, a topping residue, a vacuum residue, a coker gas oil, a solvent deasphalted oil, an oil extracted from tar sand or oil shale, and a product oil from the liquefaction of coal.

10. The catalyst composition for the hydrodesulfurization of hydrocarbon oil as claimed in claim 2, wherein the at least one metal belonging to Group VIB of the Periodic Table is chromium, molybdenum, or tungsten.

11. The catalyst composition for the hydrodesulfurization of hydrocarbon oil as claimed in claim 3, wherein the at least one metal belonging to Group VIB of the Periodic Table is chromium, molybdenum, or tungsten.

12. The catalyst composition for the hydrodesulfurization of hydrocarbon oil as claimed in claim 4, wherein the at least one metal belonging to Group VIB of the Periodic Table is chromium, molybdenum, or tungsten.

13. The catalyst composition for the hydrodesulfurization of a hydrocarbon oil as claimed in claim 2, wherein the at least one metal belonging to the Group VIII of the Periodic Table is iron, cobalt, nickel, ruthenium, rhodium, palladium, osmium, iridium, or platinum.

14. The catalyst composition for the hydrodesulfurization of a hydrocarbon oil as claimed in claim 3, wherein the at least one metal belonging to the Group VIII of the Periodic Table is iron, cobalt, nickel, ruthenium, rhodium, palladium, osmium, iridium, or platinum.

15. The catalyst composition for the hydrodesulfurization of a hydrocarbon oil as claimed in claim 4, wherein the at least one metal belonging to the Group VIII of the Periodic Table is iron, cobalt, nickel, ruthenium, rhodium, palladium, osmium, iridium, or platinum.

16. The catalyst composition for the hydrodesulfurization of a hydrocarbon oil as claimed in claim 2, wherein the at least one metal belonging to Group VIB of the Periodic Table accounts for, in terms of oxide, from about 15 to about 55% by weight with respect to the total catalyst.

17. The catalyst composition for the hydrodesulfurization of a hydrocarbon oil as claimed in claim 3, wherein the at least one metal belonging to Group VIB of the Periodic Table accounts for, in terms of oxide, from about 15 to about 55% by weight with respect to the total catalyst.

18. The catalyst composition for the hydrodesulfurization of a hydrocarbon oil as claimed in claim 4, wherein the at least one metal belonging to Group VIB of the Periodic Table accounts for, in terms of oxide, from about 15 to about 55% by weight with respect to the total catalyst.

19. The catalyst composition for the hydrodesulfurization of a hydrocarbon oil as claimed in claim 2, wherein the at least one metal belonging to Group VIII of the Periodic Table accounts for, in terms of oxide, from about 5 to about 18% by weight with respect to the total catalyst.

20. The catalyst composition for the hydrodesulfurization of a hydrocarbon oil as claimed in claim 3, wherein the at least one metal belonging to Group VIII of the Periodic Table accounts for, in terms of oxide, from about 5 to about 18% by weight with respect to the total catalyst.

21. The catalyst composition for the hydrodesulfurization of a hydrocarbon oil is claimed in claim 4, wherein the at least one metal belonging to Group VIII of the Periodic Table accounts for, in terms of oxide, from about 5 to about 18% by weight with respect to the total catalyst.

22. The catalyst composition for the hydrodesulfurization of a hydrocarbon oil as claimed in claim 2, wherein the hydrocarbon oil is a light fraction obtained by topping or vacuum distillation of crude oil, a topping residue, a vacuum residue, a coker gas oil, a solvent deasphalted oil, an oil extracted from tar sand or oil shale, and a product oil from the liquefaction of coal.

23. The catalyst composition for the hydrodesulfurization of a hydrocarbon oil as claimed in claim 3, wherein the hydrocarbon oil is a light fraction obtained by topping or vacuum distillation of crude oil, a topping residue, a vacuum residue, a coker gas oil, a solvent deasphalted oil, an oil extracted from tar sand or oil shale, and product oil from the liquefaction of coal.

24. The catalyst composition for the hydrodesulfurization of a hydrocarbon oil as claimed in claim 4, wherein the hydrocarbon oil is a light fraction obtained by topping or vacuum distillation of crude oil, a topping residue, a vacuum residue, a coker gas oil, a solvent deasphalted oil, an oil extracted from tar sand or oil shale, and a product oil from the liquefaction of coal.

* * * * *